US011858036B2

United States Patent
Cooper

(10) Patent No.: US 11,858,036 B2
(45) Date of Patent: Jan. 2, 2024

(54) SYSTEM AND METHOD TO FEED MOLD WITH MOLTEN METAL

(71) Applicant: Molten Metal Equipment Innovations, LLC, Middlefield, OH (US)

(72) Inventor: Paul V. Cooper, Chesterland, OH (US)

(73) Assignee: Molten Metal Equipment Innovations, LLC, Middlefield, OH (US)

( * ) Notice: Subject to any disclaimer, the term of this patent is extended or adjusted under 35 U.S.C. 154(b) by 0 days.

(21) Appl. No.: 16/877,296

(22) Filed: May 18, 2020

(65) Prior Publication Data

US 2020/0360987 A1 Nov. 19, 2020

Related U.S. Application Data

(60) Provisional application No. 62/852,846, filed on May 24, 2019, provisional application No. 62/849,787, filed on May 17, 2019.

(51) Int. Cl.

| | |
|---|---|
| ***B22D 41/00*** | (2006.01) |
| ***B22D 35/04*** | (2006.01) |
| ***F04D 7/06*** | (2006.01) |
| ***F27D 3/14*** | (2006.01) |
| ***F27D 27/00*** | (2010.01) |

(Continued)

(52) U.S. Cl.

CPC ............. *B22D 41/00* (2013.01); *B22D 35/04* (2013.01); *B22D 39/02* (2013.01); *F04D 7/065* (2013.01); *F04D 29/026* (2013.01); *F27B 3/045* (2013.01); *F27D 3/14* (2013.01); *F27D 27/005* (2013.01); *B22D 39/00* (2013.01); *F04D 29/426* (2013.01);

(Continued)

(58) Field of Classification Search

None

See application file for complete search history.

(56) References Cited

U.S. PATENT DOCUMENTS

| | | | |
|---|---|---|---|
| 35,604 | A | 6/1862 | Guild |
| 116,797 | A | 7/1871 | Barnhart |

(Continued)

FOREIGN PATENT DOCUMENTS

| | | |
|---|---|---|
| CA | 683469 | 3/1964 |
| CA | 2115929 | 8/1992 |

(Continued)

OTHER PUBLICATIONS

"Response to Final Office Action and Request for Continued Examination for U.S. Appl. No. 09/275,627," including Declarations of Haynes and Johnson, dated Apr. 16, 2001.

(Continued)

*Primary Examiner* — Scott R Kastler

(74) *Attorney, Agent, or Firm* — SNELL & WILMER L.L.P.

(57) ABSTRACT

A system and method for filling a mold with molten aluminum includes a molten metal pump, a vessel configured to contain molten metal, a mold for receiving molten metal, and a conduit between the vessel and the mold. Molten metal is pumped in the vessel until it reaches a level at which it flows through the conduit and into the mold. The flow of molten metal into the mold is stabilized to maintain a level of molten metal in the mold. A skin of solid metal forms between the mold and the conduit, at which time the pumping of molten metal can cease. The mold with solid metal in it can be moved.

25 Claims, 6 Drawing Sheets

(51) Int. Cl.

| | |
|---|---|
| *F27B 3/04* | (2006.01) |
| *B22D 39/02* | (2006.01) |
| *F04D 29/02* | (2006.01) |
| *B22D 39/00* | (2006.01) |
| *F27D 3/00* | (2006.01) |
| *F04D 29/42* | (2006.01) |

(52) U.S. Cl.
CPC ................ *F27D 2003/0054* (2013.01); *F27M 2001/012* (2013.01)

(56) References Cited

U.S. PATENT DOCUMENTS

| | | | |
|---|---|---|---|
| 209,219 | A | 10/1878 | Bookwaiter |
| 251,104 | A | 12/1881 | Finch |
| 307,845 | A | 11/1884 | Curtis |
| 364,804 | A | 6/1887 | Cole |
| 390,319 | A | 10/1888 | Thomson |
| 495,760 | A | 4/1893 | Seitz |
| 506,572 | A | 10/1893 | Wagener |
| 585,188 | A | 6/1897 | Davis |
| 757,932 | A | 4/1904 | Jones |
| 882,477 | A | 3/1908 | Neumann |
| 882,478 | A | 3/1908 | Neumann |
| 890,319 | A | 6/1908 | Wells |
| 898,499 | A | 9/1908 | O'Donnell |
| 909,774 | A | 1/1909 | Flora |
| 919,194 | A | 4/1909 | Livingston |
| 1,037,659 | A | 9/1912 | Rembert |
| 1,100,475 | A | 6/1914 | Franckaerts |
| 1,170,512 | A | 2/1916 | Chapman |
| 1,196,758 | A | 9/1916 | Blair |
| 1,304,068 | A | 5/1919 | Krogh |
| 1,331,997 | A | 2/1920 | Neal |
| 1,185,314 | A | 3/1920 | London |
| 1,377,101 | A | 5/1921 | Sparling |
| 1,380,798 | A | 6/1921 | Hansen et al. |
| 1,439,365 | A | 12/1922 | Hazell |
| 1,454,967 | A | 5/1923 | Gill |
| 1,470,607 | A | 10/1923 | Hazell |
| 1,513,875 | A | 11/1924 | Wilke |
| 1,518,501 | A | 12/1924 | Gill |
| 1,522,765 | A | 1/1925 | Wilke |
| 1,526,851 | A | 2/1925 | Hall |
| 1,669,668 | A | 5/1928 | Marshall |
| 1,673,594 | A | 6/1928 | Schmidt |
| 1,697,202 | A | 1/1929 | Nagle |
| 1,717,969 | A | 6/1929 | Goodner |
| 1,718,396 | A | 6/1929 | Wheeler |
| 1,896,201 | A | 2/1933 | Sterner-Rainer |
| 1,988,875 | A | 1/1935 | Saborio |
| 2,013,455 | A | 9/1935 | Baxter |
| 2,035,282 | A | 3/1936 | Schmeller, Sr. |
| 2,038,221 | A | 4/1936 | Kagi |
| 2,075,633 | A | 3/1937 | Anderegg |
| 2,090,162 | A | 8/1937 | Tighe |
| 2,091,677 | A | 8/1937 | Fredericks |
| 2,138,814 | A | 12/1938 | Bressler |
| 2,173,377 | A | 9/1939 | Schultz, Jr. et al. |
| 2,264,740 | A | 12/1941 | Brown |
| 2,280,979 | A | 4/1942 | Rocke |
| 2,290,961 | A | 7/1942 | Heuer |
| 2,300,688 | A | 11/1942 | Nagle |
| 2,304,849 | A | 12/1942 | Ruthman |
| 2,368,962 | A | 2/1945 | Blom |
| 2,383,424 | A | 8/1945 | Stepanoff |
| 2,423,655 | A | 7/1947 | Mars et al. |
| 2,488,447 | A | 11/1949 | Tangen et al. |
| 2,493,467 | A | 1/1950 | Sunnen |
| 2,515,097 | A | 7/1950 | Schryber |
| 2,515,478 | A | 7/1950 | Tooley et al. |
| 2,528,208 | A | 10/1950 | Bonsack et al. |
| 2,528,210 | A | 10/1950 | Stewart |
| 2,543,633 | A | 2/1951 | Lamphere |
| 2,566,892 | A | 4/1951 | Jacobs |
| 2,625,720 | A | 1/1953 | Ross |
| 2,626,086 | A | 1/1953 | Forrest |
| 2,676,279 | A | 4/1954 | Wilson |
| 2,677,609 | A | 4/1954 | Moore et al. |
| 2,698,583 | A | 1/1955 | House et al. |
| 2,714,354 | A | 8/1955 | Farrand |
| 2,762,095 | A | 9/1956 | Pemetzrieder |
| 2,768,587 | A | 10/1956 | Corneil |
| 2,775,348 | A | 12/1956 | Williams |
| 2,779,574 | A | 1/1957 | Schneider |
| 2,787,873 | A | 4/1957 | Hadley |
| 2,808,782 | A | 10/1957 | Thompson et al. |
| 2,809,107 | A | 10/1957 | Russell |
| 2,821,472 | A | 1/1958 | Peterson et al. |
| 2,824,520 | A | 2/1958 | Bartels |
| 2,832,292 | A | 4/1958 | Edwards |
| 2,839,006 | A | 6/1958 | Mayo |
| 2,853,019 | A | 9/1958 | Thornton |
| 2,865,295 | A | 12/1958 | Nikolaus |
| 2,865,618 | A | 12/1958 | Abell |
| 2,868,132 | A | 1/1959 | Rittershofer |
| 2,901,006 | A | 8/1959 | Andrews |
| 2,901,677 | A | 8/1959 | Chessman et al. |
| 2,906,632 | A | 9/1959 | Nickerson |
| 2,918,876 | A | 12/1959 | Howe |
| 2,948,524 | A | 8/1960 | Sweeney et al. |
| 2,958,293 | A | 11/1960 | Pray, Jr. |
| 2,966,345 | A | 12/1960 | Burgoon et al. |
| 2,966,381 | A | 12/1960 | Menzel |
| 2,978,885 | A | 4/1961 | Davison |
| 2,984,524 | A | 5/1961 | Franzen |
| 2,987,885 | A | 6/1961 | Hodge |
| 3,010,402 | A | 11/1961 | King |
| 3,015,190 | A | 1/1962 | Arbeit |
| 3,039,864 | A | 6/1962 | Hess |
| 3,044,408 | A | 7/1962 | Mellott |
| 3,048,384 | A | 8/1962 | Sweeney et al. |
| 3,070,393 | A | 12/1962 | Silverberg et al. |
| 3,092,030 | A | 6/1963 | Wunder |
| 3,099,870 | A | 8/1963 | Seeler |
| 3,128,327 | A | 4/1964 | Upton |
| 3,130,678 | A | 4/1964 | Chenault |
| 3,130,679 | A | 4/1964 | Sence |
| 3,151,565 | A | 10/1964 | Albertson et al. |
| 3,171,357 | A | 3/1965 | Egger |
| 3,172,850 | A | 3/1965 | Englesberg et al. |
| 3,203,182 | A | 8/1965 | Pohl |
| 3,227,547 | A | 1/1966 | Szekely |
| 3,244,109 | A | 4/1966 | Barske |
| 3,251,676 | A | 5/1966 | Johnson |
| 3,255,702 | A | 6/1966 | Gehrm |
| 3,258,283 | A | 6/1966 | Winberg et al. |
| 3,272,619 | A | 9/1966 | Sweeney et al. |
| 3,289,473 | A | 12/1966 | Londa |
| 3,291,473 | A | 12/1966 | Sweeney et al. |
| 3,368,805 | A | 2/1968 | Davey et al. |
| 3,374,943 | A | 3/1968 | Cervenka |
| 3,400,923 | A | 9/1968 | Howie et al. |
| 3,417,929 | A | 12/1968 | Secrest et al. |
| 3,432,336 | A | 3/1969 | Langrod et al. |
| 3,459,133 | A | 8/1969 | Scheffler |
| 3,459,346 | A | 8/1969 | Tinnes |
| 3,477,383 | A | 11/1969 | Rawson et al. |
| 3,487,805 | A | 1/1970 | Satterthwaite |
| 3,512,762 | A | 5/1970 | Umbricht |
| 3,512,788 | A | 5/1970 | Kilbane |
| 3,532,445 | A | 10/1970 | Scheffler et al. |
| 3,561,885 | A | 2/1971 | Lake |
| 3,575,525 | A | 4/1971 | Fox et al. |
| 3,581,767 | A | 6/1971 | Jackson |
| 3,612,715 | A | 10/1971 | Yedidiah |
| 3,618,917 | A | 11/1971 | Fredrikson et al. |
| 3,620,716 | A | 11/1971 | Hess |
| 3,650,730 | A | 3/1972 | Derham et al. |
| 3,689,048 | A | 9/1972 | Foulard et al. |
| 3,715,112 | A | 2/1973 | Carbonnel |
| 3,732,032 | A | 5/1973 | Daneel |
| 3,737,304 | A | 6/1973 | Blayden et al. |
| 3,737,305 | A | 6/1973 | Blayden et al. |

(56) References Cited

U.S. PATENT DOCUMENTS

| | | | |
|---|---|---|---|
| 3,743,263 | A | 7/1973 | Szekely |
| 3,743,500 | A | 7/1973 | Foulard et al. |
| 3,753,690 | A | 8/1973 | Emley et al. |
| 3,759,628 | A | 9/1973 | Kempf |
| 3,759,635 | A | 9/1973 | Carter et al. |
| 3,767,382 | A | 10/1973 | Bruno et al. |
| 3,776,660 | A | 12/1973 | Anderson et al. |
| 3,785,632 | A | 1/1974 | Kraemer et al. |
| 3,787,143 | A | 1/1974 | Carbonnel et al. |
| 3,799,522 | A | 3/1974 | Brant et al. |
| 3,799,523 | A | 3/1974 | Seki |
| 3,807,708 | A | 4/1974 | Jones |
| 3,814,400 | A | 6/1974 | Seki |
| 3,824,028 | A | 7/1974 | Zenkner et al. |
| 3,824,042 | A | 7/1974 | Barnes et al. |
| 3,836,280 | A | 9/1974 | Koch |
| 3,839,019 | A | 10/1974 | Bruno et al. |
| 3,844,972 | A | 10/1974 | Tully, Jr. et al. |
| 3,871,872 | A | 3/1975 | Downing et al. |
| 3,873,073 | A | 3/1975 | Baum et al. |
| 3,873,305 | A | 3/1975 | Claxton et al. |
| 3,881,039 | A | 4/1975 | Baldieri et al. |
| 3,886,992 | A | 6/1975 | Maas et al. |
| 3,915,594 | A | 10/1975 | Nesseth |
| 3,915,694 | A | 10/1975 | Ando |
| 3,935,003 | A | 1/1976 | Steinke et al. |
| 3,941,588 | A | 3/1976 | Dremann |
| 3,941,589 | A | 3/1976 | Norman et al. |
| 3,942,473 | A | 3/1976 | Chodash |
| 3,954,134 | A | 5/1976 | Maas et al. |
| 3,958,979 | A | 5/1976 | Valdo |
| 3,958,981 | A | 5/1976 | Forberg et al. |
| 3,961,778 | A | 6/1976 | Carbonnel et al. |
| 3,966,456 | A | 6/1976 | Ellenbaum et al. |
| 3,967,286 | A | 6/1976 | Andersson et al. |
| 3,972,709 | A | 8/1976 | Chin et al. |
| 3,973,871 | A | 8/1976 | Hance |
| 3,984,234 | A | 10/1976 | Claxton et al. |
| 3,985,000 | A | 10/1976 | Hartz |
| 3,997,336 | A | 12/1976 | van Linden et al. |
| 4,003,560 | A | 1/1977 | Carbonnel |
| 4,008,884 | A | 2/1977 | Fitzpatrick et al. |
| 4,018,598 | A | 4/1977 | Markus |
| 4,043,146 | A | 8/1977 | Stegherr et al. |
| 4,052,199 | A | 10/1977 | Mangalick |
| 4,055,390 | A | 10/1977 | Young |
| 4,063,849 | A | 12/1977 | Modianos |
| 4,068,965 | A | 1/1978 | Lichti |
| 4,073,606 | A | 2/1978 | Eller |
| 4,091,970 | A | 5/1978 | Komiyama et al. |
| 4,119,141 | A | 10/1978 | Thut et al. |
| 4,125,146 | A | 11/1978 | Muller |
| 4,126,360 | A | 11/1978 | Miller et al. |
| 4,128,415 | A | 12/1978 | van Linden et al. |
| 4,147,474 | A | 4/1979 | Heimdal et al. |
| 4,169,584 | A | 10/1979 | Mangalick |
| 4,191,486 | A | 3/1980 | Pelton |
| 4,213,742 | A | 7/1980 | Henshaw |
| 4,242,039 | A | 12/1980 | Villard et al. |
| 4,244,423 | A | 1/1981 | Thut et al. |
| 4,286,985 | A | 9/1981 | van Linden et al. |
| 4,305,214 | A | 12/1981 | Hurst |
| 4,322,245 | A | 3/1982 | Claxton |
| 4,338,062 | A | 7/1982 | Neal |
| 4,347,041 | A | 8/1982 | Cooper |
| 4,351,514 | A | 9/1982 | Koch |
| 4,355,789 | A | 10/1982 | Dolzhenkov et al. |
| 4,356,940 | A | 11/1982 | Ansorge |
| 4,360,314 | A | 11/1982 | Pennell |
| 4,370,096 | A | 1/1983 | Church |
| 4,372,541 | A | 2/1983 | Bocourt et al. |
| 4,375,937 | A | 3/1983 | Cooper |
| 4,389,159 | A | 6/1983 | Sarvanne |
| 4,392,888 | A | 7/1983 | Eckert et al. |
| 4,410,299 | A | 10/1983 | Shimoyama |
| 4,419,049 | A | 12/1983 | Gerboth et al. |
| 4,456,424 | A | 6/1984 | Araoka |
| 4,470,846 | A | 9/1984 | Dube |
| 4,474,315 | A | 10/1984 | Gilbert et al. |
| 4,496,393 | A | 1/1985 | Lustenberger |
| 4,504,392 | A | 3/1985 | Groteke |
| 4,509,979 | A | 4/1985 | Bauer |
| 4,530,641 | A | 7/1985 | Gschwender |
| 4,537,624 | A | 8/1985 | Tenhover et al. |
| 4,537,625 | A | 8/1985 | Tenhover et al. |
| 4,545,887 | A | 10/1985 | Amesen |
| 4,556,419 | A | 12/1985 | Otsuka et al. |
| 4,557,766 | A | 12/1985 | Tenhover et al. |
| 4,586,845 | A | 5/1986 | Morris |
| 4,592,700 | A | 6/1986 | Toguchi et al. |
| 4,594,052 | A | 6/1986 | Niskanen |
| 4,596,510 | A | 6/1986 | Arneth et al. |
| 4,598,899 | A | 7/1986 | Cooper |
| 4,600,222 | A | 7/1986 | Appling |
| 4,607,825 | A | 8/1986 | Briolle et al. |
| 4,609,442 | A | 9/1986 | Tenhover et al. |
| 4,611,790 | A | 9/1986 | Otsuka et al. |
| 4,617,232 | A | 10/1986 | Chandler et al. |
| 4,634,105 | A | 1/1987 | Withers et al. |
| 4,640,666 | A | 2/1987 | Sodergard |
| 4,655,610 | A | 4/1987 | Al-Jaroudi |
| 4,668,166 | A | 5/1987 | Lutz |
| 4,669,953 | A | 6/1987 | Gschwender |
| 4,673,434 | A | 6/1987 | Withers et al. |
| 4,682,585 | A | 7/1987 | Hiltebrandt |
| 4,684,281 | A | 8/1987 | Patterson |
| 4,685,822 | A | 8/1987 | Pelton |
| 4,696,703 | A | 9/1987 | Henderson et al. |
| 4,701,226 | A | 10/1987 | Henderson et al. |
| 4,702,768 | A | 10/1987 | Areauz et al. |
| 4,714,371 | A | 12/1987 | Cuse |
| 4,717,540 | A | 1/1988 | McRae et al. |
| 4,739,974 | A | 4/1988 | Mordue |
| 4,741,664 | A | 5/1988 | Olmstead |
| 4,743,428 | A | 5/1988 | McRae et al. |
| 4,747,583 | A | 5/1988 | Gordon et al. |
| 4,767,230 | A | 8/1988 | Leas, Jr. |
| 4,770,701 | A | 9/1988 | Henderson et al. |
| 4,786,230 | A | 11/1988 | Thut |
| 4,802,656 | A | 2/1989 | Hudault et al. |
| 4,804,168 | A | 2/1989 | Otsuka et al. |
| 4,810,314 | A | 3/1989 | Henderson et al. |
| 4,822,473 | A | 4/1989 | Arnesen |
| 4,834,573 | A | 5/1989 | Asano et al. |
| 4,842,227 | A | 6/1989 | Harrington et al. |
| 4,844,425 | A | 7/1989 | Piras et al. |
| 4,851,296 | A | 7/1989 | Tenhover et al. |
| 4,854,834 | A | 8/1989 | Gschwender et al. |
| 4,859,413 | A | 8/1989 | Harris et al. |
| 4,860,819 | A | 8/1989 | Moscoe et al. |
| 4,867,638 | A | 9/1989 | Handtmann et al. |
| 4,884,786 | A | 12/1989 | Gillespie |
| 4,898,367 | A | 2/1990 | Cooper |
| 4,908,060 | A | 3/1990 | Duenkelmann |
| 4,909,704 | A | 3/1990 | Lutz |
| 4,911,726 | A | 3/1990 | Warkentin |
| 4,923,770 | A | 5/1990 | Grasselli et al. |
| 4,930,986 | A | 6/1990 | Cooper |
| 4,931,091 | A | 6/1990 | Waite et al. |
| 4,940,214 | A | 7/1990 | Gillespie |
| 4,940,384 | A | 7/1990 | Amra et al. |
| 4,954,167 | A | 9/1990 | Cooper |
| 4,967,827 | A | 11/1990 | Campbell |
| 4,973,433 | A | 11/1990 | Gilbert et al. |
| 4,986,736 | A | 1/1991 | Kajiwara et al. |
| 4,989,736 | A | 2/1991 | Andersson et al. |
| 5,015,518 | A | 5/1991 | Sasaki et al. |
| 5,025,198 | A | 6/1991 | Mordue et al. |
| 5,028,211 | A | 7/1991 | Mordue et al. |
| 5,029,821 | A | 7/1991 | Bar-on et al. |
| 5,058,654 | A | 10/1991 | Simmons |
| 5,078,572 | A | 1/1992 | Amra et al. |
| 5,080,715 | A | 1/1992 | Provencher et al. |
| 5,083,753 | A | 1/1992 | Soofi |

(56) References Cited

U.S. PATENT DOCUMENTS 5,088,893 A 2/1992 Gilbert et al.
5,092,821 A 3/1992 Gilbert et al.
5,098,134 A 3/1992 Monckton
5,099,554 A 3/1992 Cooper
5,114,312 A 5/1992 Stanislao
5,126,047 A 6/1992 Martin et al.
5,131,632 A 7/1992 Olson
5,135,202 A 8/1992 Yamashita et al.
5,143,357 A 9/1992 Gilbert et al.
5,145,322 A 9/1992 Senior, Jr. et al.
5,152,631 A 10/1992 Bauer
5,154,652 A 10/1992 Ecklesdafer
5,158,440 A 10/1992 Cooper et al.
5,162,858 A 11/1992 Shoji et al.
5,165,858 A 11/1992 Gilbert et al.
5,177,304 A 1/1993 Nagel
5,191,154 A 3/1993 Nagel
5,192,193 A 3/1993 Cooper et al.
5,202,100 A 4/1993 Nagel et al.
5,203,681 A 4/1993 Cooper
5,209,641 A 5/1993 Hoglund et al.
5,215,448 A 6/1993 Cooper
5,268,020 A 12/1993 Claxton
5,286,163 A 2/1994 Amra et al.
5,298,233 A 3/1994 Nagel
5,301,620 A 4/1994 Nagel et al.
5,303,903 A 4/1994 Butler et al.
5,308,045 A 5/1994 Cooper
5,310,412 A 5/1994 Gilbert et al.
5,318,360 A 6/1994 Langer et al.
5,322,547 A 6/1994 Nagel et al.
5,324,341 A 6/1994 Nagel et al.
5,330,328 A 7/1994 Cooper
5,354,940 A 10/1994 Nagel
5,358,549 A 10/1994 Nagel et al.
5,358,697 A 10/1994 Nagel
5,364,078 A 11/1994 Pelton
5,369,063 A 11/1994 Gee et al.
5,383,651 A 1/1995 Blasen et al.
5,388,633 A 2/1995 Mercer, II et al.
5,395,405 A 3/1995 Nagel et al.
5,399,074 A 3/1995 Nose et al.
5,407,294 A 4/1995 Giannini
5,411,240 A 5/1995 Rapp et al.
5,425,410 A 6/1995 Reynolds
5,431,551 A 7/1995 Aquino et al.
5,435,982 A 7/1995 Wilkinson
5,436,210 A 7/1995 Wilkinson et al.
5,443,572 A 8/1995 Wilkinson et al.
5,454,423 A 10/1995 Tsuchida et al.
5,468,280 A 11/1995 Areaux
5,470,201 A 11/1995 Gilbert et al.
5,484,265 A 1/1996 Horvath et al.
5,489,734 A 2/1996 Nagel et al.
5,491,279 A 2/1996 Robert et al.
5,494,382 A 2/1996 Kloppers
5,495,746 A 3/1996 Sigworth
5,505,143 A 4/1996 Nagel
5,505,435 A 4/1996 Laszlo
5,509,791 A 4/1996 Turner
5,511,766 A 4/1996 Vassilicos
5,520,422 A 5/1996 Friedrich
5,537,940 A 7/1996 Nagel et al.
5,543,558 A 8/1996 Nagel et al.
5,555,822 A 9/1996 Loewen et al.
5,558,501 A 9/1996 Wang et al.
5,558,505 A 9/1996 Mordue et al.
5,571,486 A 11/1996 Robert et al.
5,585,532 A 12/1996 Nagel
5,586,863 A 12/1996 Gilbert et al.
5,591,243 A 1/1997 Colussi et al.
5,597,289 A 1/1997 Thut
5,613,245 A 3/1997 Robert
5,616,167 A 4/1997 Eckert
5,622,481 A 4/1997 Thut
5,629,464 A 5/1997 Bach et al.
5,634,770 A 6/1997 Gilbert et al.
5,640,706 A 6/1997 Nagel et al.
5,640,707 A 6/1997 Nagel et al.
5,640,709 A 6/1997 Nagel et al.
5,655,849 A 8/1997 McEwen et al.
5,660,614 A 8/1997 Waite et al.
5,662,725 A 9/1997 Cooper
5,676,520 A 10/1997 Thut
5,678,244 A 10/1997 Shaw et al.
5,678,807 A 10/1997 Cooper
5,679,132 A 10/1997 Rauenzahn et al.
5,685,701 A 11/1997 Chandler et al.
5,690,888 A 11/1997 Robert
5,695,732 A 12/1997 Sparks et al.
5,716,195 A 2/1998 Thut
5,717,149 A 2/1998 Nagel et al.
5,718,416 A 2/1998 Flisakowski et al.
5,735,668 A 4/1998 Klein
5,735,935 A 4/1998 Areaux
5,741,422 A 4/1998 Eichenmiller et al.
5,744,093 A 4/1998 Davis
5,744,117 A 4/1998 Wilkinson et al.
5,745,861 A 4/1998 Bell et al.
5,755,847 A 5/1998 Quayle
5,758,712 A * 6/1998 Pedersen .................. B22C 9/02
164/133
5,772,324 A 6/1998 Falk
5,776,420 A 7/1998 Nagel
5,785,494 A 7/1998 Vild et al.
5,842,832 A 12/1998 Thut
5,846,481 A 12/1998 Tilak
5,858,059 A 1/1999 Abramovich et al.
5,863,314 A 1/1999 Morando
5,866,095 A 2/1999 McGeever et al.
5,875,385 A 2/1999 Stephenson et al.
5,935,528 A 8/1999 Stephenson et al.
5,944,496 A 8/1999 Cooper
5,947,705 A 9/1999 Mordue et al.
5,948,352 A 9/1999 Jagt et al.
5,951,243 A 9/1999 Cooper
5,961,285 A 10/1999 Meneice et al.
5,963,580 A 10/1999 Eckert
5,992,230 A 11/1999 Scarpa et al.
5,993,726 A 11/1999 Huang
5,993,728 A 11/1999 Vild
6,007,313 A 12/1999 Sigel et al.
6,019,576 A 2/2000 Thut
6,027,685 A 2/2000 Cooper
6,036,745 A 3/2000 Gilbert et al.
6,074,455 A 6/2000 van Linden et al.
6,082,965 A 7/2000 Morando
6,093,000 A 7/2000 Cooper
6,096,109 A 8/2000 Nagel et al.
6,113,154 A 9/2000 Thut
6,123,523 A 9/2000 Cooper
6,152,691 A 11/2000 Thut
6,168,753 B1 1/2001 Morando
6,187,096 B1 2/2001 Thut
6,199,836 B1 3/2001 Rexford et al.
6,217,823 B1 4/2001 Vild et al.
6,231,639 B1 5/2001 Eichenmiller
6,250,881 B1 6/2001 Mordue et al.
6,254,340 B1 7/2001 Vild et al.
6,270,717 B1 8/2001 Tremblay et al.
6,280,157 B1 8/2001 Cooper
6,293,759 B1 9/2001 Thut
6,303,074 B1 10/2001 Cooper
6,345,964 B1 2/2002 Cooper
6,354,796 B1 3/2002 Morando
6,358,467 B1 3/2002 Mordue
6,364,930 B1 4/2002 Kos
6,371,723 B1 4/2002 Grant et al.
6,398,525 B1 6/2002 Cooper
6,439,860 B1 8/2002 Greer
6,451,247 B1 9/2002 Mordue et al.
6,457,940 B1 10/2002 Lehman
6,457,950 B1 10/2002 Cooper et al.
6,464,458 B2 10/2002 Vild et al.

(56) References Cited

U.S. PATENT DOCUMENTS 6,474,962 B1 11/2002 Allen et al.
6,495,948 B1 12/2002 Garrett, III
6,497,559 B1 12/2002 Grant
6,500,228 B1 12/2002 Klingensmith et al.
6,503,292 B2 1/2003 Klingensmith et al.
6,524,066 B2 2/2003 Thut
6,533,535 B2 3/2003 Thut
6,551,060 B2 4/2003 Mordue et al.
6,562,286 B1 5/2003 Lehman
6,656,415 B2 12/2003 Kos
6,679,936 B2 1/2004 Quackenbush
6,689,310 B1 2/2004 Cooper
6,709,234 B2 3/2004 Gilbert et al.
6,716,147 B1 4/2004 Hinkle et al.
6,723,276 B1 4/2004 Cooper
6,805,834 B2 10/2004 Thut
6,843,640 B2 1/2005 Mordue et al.
6,848,497 B2 2/2005 Sale et al.
6,869,271 B2 3/2005 Gilbert et al.
6,869,564 B2 3/2005 Gilbert et al.
6,881,030 B2 4/2005 Thut
6,887,424 B2 5/2005 Ohno et al.
6,887,425 B2 5/2005 Mordue et al.
6,902,696 B2 6/2005 Klingensmith et al.
7,037,462 B2 5/2006 Klingensmith et al.
7,074,361 B2 7/2006 Carolla et al.
7,083,758 B2 8/2006 Tremblay
7,131,482 B2 11/2006 Vincent et al.
7,157,043 B2 1/2007 Neff
7,204,954 B2 4/2007 Mizuno
7,273,582 B2 9/2007 Mordue
7,279,128 B2 10/2007 Kennedy et al.
7,326,028 B2 2/2008 Morando
7,402,276 B2 7/2008 Cooper
7,470,392 B2 12/2008 Cooper
7,476,357 B2 1/2009 Thut
7,481,966 B2 1/2009 Mizuno
7,497,988 B2 3/2009 Thut
7,507,365 B2 3/2009 Thut
7,507,367 B2 3/2009 Cooper
7,543,605 B1 6/2009 Morando
7,731,891 B2 6/2010 Cooper
7,771,171 B2 8/2010 Mohr
7,841,379 B1 * 11/2010 Evans .................... B22D 18/04
164/133
7,896,617 B1 3/2011 Morando
7,906,068 B2 3/2011 Cooper
8,075,837 B2 12/2011 Cooper
8,110,141 B2 2/2012 Cooper
8,137,023 B2 3/2012 Greer
8,142,145 B2 3/2012 Thut
8,178,037 B2 5/2012 Cooper
8,328,540 B2 12/2012 Wang
8,333,921 B2 12/2012 Thut
8,337,746 B2 * 12/2012 Cooper ............... C22B 21/0084
266/239
8,361,379 B2 1/2013 Cooper
8,366,993 B2 2/2013 Cooper
8,409,495 B2 4/2013 Cooper
8,440,135 B2 5/2013 Cooper
8,444,911 B2 5/2013 Cooper
8,449,814 B2 5/2013 Cooper
8,475,594 B2 7/2013 Bright et al.
8,475,708 B2 7/2013 Cooper
8,480,950 B2 7/2013 Jetten et al.
8,501,084 B2 8/2013 Cooper
8,524,146 B2 9/2013 Cooper
8,529,828 B2 9/2013 Cooper
8,535,603 B2 9/2013 Cooper
8,580,218 B2 11/2013 Turenne et al.
8,613,884 B2 12/2013 Cooper
8,714,914 B2 5/2014 Cooper
8,753,563 B2 6/2014 Cooper
8,840,359 B2 9/2014 Vick et al.
8,899,932 B2 12/2014 Tetkoskie et al.
8,915,830 B2 12/2014 March et al.
8,920,680 B2 12/2014 Mao
9,011,761 B2 4/2015 Cooper
9,017,597 B2 4/2015 Cooper
9,034,244 B2 5/2015 Cooper
9,057,376 B2 6/2015 Thut
9,057,377 B1 6/2015 Thut
9,074,601 B1 7/2015 Thut
9,080,577 B2 7/2015 Cooper
9,108,224 B2 8/2015 Schererz et al.
9,108,244 B2 8/2015 Cooper
9,156,087 B2 10/2015 Cooper
9,193,532 B2 11/2015 March et al.
9,205,490 B2 12/2015 Cooper
9,234,520 B2 1/2016 Morando
9,273,376 B2 3/2016 Lutes et al.
9,328,615 B2 5/2016 Cooper
9,377,028 B2 6/2016 Cooper
9,382,599 B2 7/2016 Cooper
9,383,140 B2 7/2016 Cooper
9,388,925 B2 7/2016 Juarez
9,409,232 B2 8/2016 Cooper
9,410,744 B2 8/2016 Cooper
9,422,942 B2 8/2016 Cooper
9,435,343 B2 9/2016 Cooper
9,464,636 B2 10/2016 Cooper
9,470,239 B2 10/2016 Cooper
9,476,644 B2 10/2016 Howitt et al.
9,481,035 B2 11/2016 Cooper
9,481,918 B2 11/2016 Vild et al.
9,482,469 B2 11/2016 Cooper
9,494,366 B1 11/2016 Thut
9,506,129 B2 11/2016 Cooper
9,506,346 B2 11/2016 Bright et al.
9,532,670 B2 1/2017 Vaessen et al.
9,566,645 B2 2/2017 Cooper
9,581,388 B2 2/2017 Cooper
9,587,883 B2 3/2017 Cooper
9,632,670 B2 4/2017 Wu et al.
9,643,247 B2 5/2017 Cooper et al.
9,657,578 B2 5/2017 Cooper
9,855,600 B2 1/2018 Cooper
9,862,026 B2 1/2018 Cooper
9,903,383 B2 2/2018 Cooper
9,909,808 B2 3/2018 Cooper
9,920,767 B2 3/2018 Klain et al.
9,925,587 B2 3/2018 Cooper
9,951,777 B2 4/2018 Morando et al.
9,970,442 B2 5/2018 Tipton
9,982,945 B2 5/2018 Cooper
10,052,688 B2 8/2018 Cooper
10,072,897 B2 9/2018 Cooper
10,126,058 B2 11/2018 Cooper
10,126,059 B2 11/2018 Cooper
10,138,892 B2 11/2018 Cooper
10,195,664 B2 2/2019 Cooper et al.
10,267,314 B2 4/2019 Cooper
10,274,256 B2 4/2019 Cooper
10,302,361 B2 5/2019 Cooper
10,307,821 B2 6/2019 Cooper
10,309,725 B2 6/2019 Cooper
10,322,451 B2 6/2019 Cooper
10,345,045 B2 7/2019 Cooper
10,352,620 B2 7/2019 Cooper
10,428,821 B2 10/2019 Cooper
10,458,708 B2 10/2019 Cooper
10,465,688 B2 11/2019 Cooper
10,562,097 B2 2/2020 Cooper
10,570,745 B2 2/2020 Cooper
10,641,270 B2 5/2020 Cooper
10,641,279 B2 5/2020 Cooper
10,675,679 B2 6/2020 Cooper
11,020,798 B2 6/2021 Cooper et al.
11,098,719 B2 8/2021 Cooper
11,098,720 B2 8/2021 Cooper
11,103,920 B2 8/2021 Cooper
11,130,173 B2 9/2021 Cooper
11,149,747 B2 10/2021 Cooper
11,167,345 B2 11/2021 Cooper et al.

(56) References Cited

U.S. PATENT DOCUMENTS

| | | | |
|---|---|---|---|
| 11,185,916 | B2 | 11/2021 | Cooper et al. |
| 11,286,939 | B2 | 3/2022 | Cooper |
| 11,358,216 | B2 | 6/2022 | Cooper |
| 11,358,217 | B2 | 6/2022 | Cooper |
| 11,391,293 | B2 | 7/2022 | Cooper |
| 11,471,938 | B2 | 10/2022 | Fontana et al. |
| 11,519,414 | B2 | 12/2022 | Cooper |
| 2001/0000465 | A1 | 4/2001 | Thut |
| 2002/0089099 | A1 | 7/2002 | Denning |
| 2002/0102159 | A1 | 8/2002 | Thut |
| 2002/0146313 | A1 | 10/2002 | Thut |
| 2002/0185790 | A1* | 12/2002 | Klingensmith ........... F27B 3/19 266/81 |
| 2002/0185794 | A1 | 12/2002 | Vincent |
| 2003/0047850 | A1 | 3/2003 | Areaux |
| 2003/0075844 | A1 | 4/2003 | Mordue et al. |
| 2003/0082052 | A1 | 5/2003 | Gilbert et al. |
| 2003/0151176 | A1 | 8/2003 | Ohno |
| 2003/0201583 | A1 | 10/2003 | Klingensmith |
| 2004/0050525 | A1 | 3/2004 | Kennedy et al. |
| 2004/0076533 | A1 | 4/2004 | Cooper |
| 2004/0096330 | A1 | 5/2004 | Gilbert et al. |
| 2004/0115079 | A1 | 6/2004 | Cooper |
| 2004/0245684 | A1 | 12/2004 | Kojo et al. |
| 2004/0262825 | A1 | 12/2004 | Cooper |
| 2005/0013713 | A1 | 1/2005 | Cooper |
| 2005/0013714 | A1 | 1/2005 | Cooper |
| 2005/0013715 | A1 | 1/2005 | Cooper |
| 2005/0053499 | A1 | 3/2005 | Cooper |
| 2005/0077730 | A1 | 4/2005 | Thut |
| 2005/0081607 | A1 | 4/2005 | Patel et al. |
| 2005/0116398 | A1 | 6/2005 | Tremblay |
| 2006/0180963 | A1 | 8/2006 | Thut |
| 2006/0198725 | A1 | 9/2006 | Thut |
| 2007/0253807 | A1 | 11/2007 | Cooper |
| 2008/0163999 | A1 | 7/2008 | Hymas et al. |
| 2008/0202644 | A1 | 8/2008 | Grassi |
| 2008/0211147 | A1 | 9/2008 | Cooper |
| 2008/0213111 | A1 | 9/2008 | Cooper |
| 2008/0230966 | A1 | 9/2008 | Cooper |
| 2008/0253905 | A1 | 10/2008 | Morando et al. |
| 2008/0304970 | A1 | 12/2008 | Cooper |
| 2008/0314548 | A1 | 12/2008 | Cooper |
| 2009/0054167 | A1 | 2/2009 | Cooper |
| 2009/0140013 | A1 | 6/2009 | Cooper |
| 2009/0269191 | A1 | 10/2009 | Cooper |
| 2010/0104415 | A1 | 4/2010 | Morando |
| 2010/0200354 | A1 | 8/2010 | Yagi et al. |
| 2011/0133374 | A1 | 6/2011 | Cooper |
| 2011/0140318 | A1 | 6/2011 | Reeves et al. |
| 2011/0140319 | A1* | 6/2011 | Cooper ................. C22B 21/064 266/217 |
| 2011/0140619 | A1 | 6/2011 | Lin |
| 2011/0142603 | A1 | 6/2011 | Cooper |
| 2011/0142606 | A1 | 6/2011 | Cooper |
| 2011/0148012 | A1 | 6/2011 | Cooper |
| 2011/0163486 | A1 | 7/2011 | Cooper |
| 2011/0210232 | A1 | 9/2011 | Cooper |
| 2011/0220771 | A1 | 9/2011 | Cooper |
| 2011/0227338 | A1 | 9/2011 | Pollack |
| 2011/0303706 | A1 | 12/2011 | Cooper |
| 2012/0003099 | A1 | 1/2012 | Tetkoskie |
| 2012/0163959 | A1 | 6/2012 | Morando |
| 2013/0105102 | A1 | 5/2013 | Cooper |
| 2013/0142625 | A1 | 6/2013 | Cooper |
| 2013/0214014 | A1 | 8/2013 | Cooper |
| 2013/0224038 | A1 | 8/2013 | Tetkoskie et al. |
| 2013/0292426 | A1 | 11/2013 | Cooper |
| 2013/0292427 | A1 | 11/2013 | Cooper |
| 2013/0299524 | A1 | 11/2013 | Cooper |
| 2013/0299525 | A1 | 11/2013 | Cooper |
| 2013/0306687 | A1 | 11/2013 | Cooper |
| 2013/0334744 | A1 | 12/2013 | Tremblay |
| 2013/0343904 | A1 | 12/2013 | Cooper |
| 2014/0008849 | A1 | 1/2014 | Cooper |
| 2014/0041252 | A1 | 2/2014 | Vild et al. |
| 2014/0044520 | A1 | 2/2014 | Tipton |
| 2014/0083253 | A1 | 3/2014 | Lutes et al. |
| 2014/0210144 | A1 | 7/2014 | Torres et al. |
| 2014/0232048 | A1 | 8/2014 | Howitt et al. |
| 2014/0252697 | A1 | 9/2014 | Rauch |
| 2014/0252701 | A1 | 9/2014 | Cooper |
| 2014/0261800 | A1 | 9/2014 | Cooper |
| 2014/0263482 | A1 | 9/2014 | Cooper |
| 2014/0265068 | A1 | 9/2014 | Cooper |
| 2014/0271219 | A1 | 9/2014 | Cooper |
| 2014/0363309 | A1 | 12/2014 | Henderson et al. |
| 2015/0069679 | A1 | 3/2015 | Henderson et al. |
| 2015/0184311 | A1* | 7/2015 | Turenne ................ C01B 33/037 65/33.9 |
| 2015/0192364 | A1 | 7/2015 | Cooper |
| 2015/0217369 | A1 | 8/2015 | Cooper |
| 2015/0219111 | A1 | 8/2015 | Cooper |
| 2015/0219112 | A1 | 8/2015 | Cooper |
| 2015/0219113 | A1 | 8/2015 | Cooper |
| 2015/0219114 | A1 | 8/2015 | Cooper |
| 2015/0224574 | A1 | 8/2015 | Cooper |
| 2015/0252807 | A1 | 9/2015 | Cooper |
| 2015/0285557 | A1 | 10/2015 | Cooper |
| 2015/0285558 | A1 | 10/2015 | Cooper |
| 2015/0323256 | A1 | 11/2015 | Cooper |
| 2015/0328682 | A1 | 11/2015 | Cooper |
| 2015/0328683 | A1 | 11/2015 | Cooper |
| 2016/0031007 | A1 | 2/2016 | Cooper |
| 2016/0040265 | A1 | 2/2016 | Cooper |
| 2016/0047602 | A1 | 2/2016 | Cooper |
| 2016/0053762 | A1 | 2/2016 | Cooper |
| 2016/0053814 | A1 | 2/2016 | Cooper |
| 2016/0082507 | A1 | 3/2016 | Cooper |
| 2016/0089718 | A1 | 3/2016 | Cooper |
| 2016/0091251 | A1 | 3/2016 | Cooper |
| 2016/0116216 | A1 | 4/2016 | Schlicht et al. |
| 2016/0221855 | A1 | 8/2016 | Retorick et al. |
| 2016/0250686 | A1 | 9/2016 | Cooper |
| 2016/0265535 | A1 | 9/2016 | Cooper |
| 2016/0305711 | A1 | 10/2016 | Cooper |
| 2016/0320129 | A1 | 11/2016 | Cooper |
| 2016/0320130 | A1 | 11/2016 | Cooper |
| 2016/0320131 | A1 | 11/2016 | Cooper |
| 2016/0346836 | A1 | 12/2016 | Henderson et al. |
| 2016/0348973 | A1 | 12/2016 | Cooper |
| 2016/0348974 | A1 | 12/2016 | Cooper |
| 2016/0348975 | A1 | 12/2016 | Cooper |
| 2017/0037852 | A1 | 2/2017 | Bright et al. |
| 2017/0038146 | A1 | 2/2017 | Cooper |
| 2017/0045298 | A1 | 2/2017 | Cooper |
| 2017/0056973 | A1 | 3/2017 | Tremblay et al. |
| 2017/0082368 | A1 | 3/2017 | Cooper |
| 2017/0106435 | A1 | 4/2017 | Vincent |
| 2017/0106441 | A1 | 4/2017 | Vincent |
| 2017/0130298 | A1 | 5/2017 | Teranishi et al. |
| 2017/0167793 | A1 | 6/2017 | Cooper et al. |
| 2017/0198721 | A1 | 7/2017 | Cooper |
| 2017/0219289 | A1 | 8/2017 | Williams et al. |
| 2017/0241713 | A1 | 8/2017 | Henderson et al. |
| 2017/0246681 | A1 | 8/2017 | Tipton et al. |
| 2017/0276430 | A1 | 9/2017 | Cooper |
| 2018/0058465 | A1 | 3/2018 | Cooper |
| 2018/0111189 | A1 | 4/2018 | Cooper |
| 2018/0178281 | A1 | 6/2018 | Cooper |
| 2018/0195513 | A1 | 7/2018 | Cooper |
| 2018/0311726 | A1 | 11/2018 | Cooper |
| 2019/0032675 | A1 | 1/2019 | Cooper |
| 2019/0270134 | A1 | 9/2019 | Cooper |
| 2019/0293089 | A1 | 9/2019 | Cooper |
| 2019/0351481 | A1 | 11/2019 | Tetkoskie |
| 2019/0360491 | A1 | 11/2019 | Cooper |
| 2019/0360492 | A1 | 11/2019 | Cooper |
| 2019/0368494 | A1 | 12/2019 | Cooper |
| 2020/0130050 | A1 | 4/2020 | Cooper |
| 2020/0130051 | A1 | 4/2020 | Cooper |
| 2020/0130052 | A1 | 4/2020 | Cooper |
| 2020/0130053 | A1 | 4/2020 | Cooper |
| 2020/0130054 | A1 | 4/2020 | Cooper |

(56) References Cited

U.S. PATENT DOCUMENTS

| | | | |
|---|---|---|---|
| 2020/0182247 | A1 | 6/2020 | Cooper |
| 2020/0182248 | A1 | 6/2020 | Cooper |
| 2020/0256350 | A1 | 8/2020 | Cooper |
| 2020/0360987 | A1 | 11/2020 | Cooper |
| 2020/0360988 | A1 | 11/2020 | Fontana |
| 2020/0360989 | A1 | 11/2020 | Cooper |
| 2020/0360990 | A1 | 11/2020 | Cooper |
| 2020/0362865 | A1 | 11/2020 | Cooper |
| 2020/0363128 | A1 | 11/2020 | Cooper |
| 2021/0199115 | A1 | 7/2021 | Cooper |
| 2021/0254622 | A1 | 8/2021 | Cooper |
| 2022/0025905 | A1 | 1/2022 | Cooper |
| 2022/0080498 | A1 | 3/2022 | Cooper et al. |
| 2022/0193764 | A1 | 6/2022 | Cooper |
| 2022/0213895 | A1 | 7/2022 | Cooper |
| 2022/0234099 | A1 | 7/2022 | Cooper |
| 2022/0381246 | A1 | 12/2022 | Cooper et al. |
| 2023/0001474 | A1 | 1/2023 | Fontana |
| 2023/0219132 | A1 | 7/2023 | Cooper |

FOREIGN PATENT DOCUMENTS

| | | | |
|---|---|---|---|
| CA | 2244251 | | 6/1998 |
| CA | 2305865 | | 2/2000 |
| CA | 2176475 | | 7/2005 |
| CA | 2924572 | | 4/2015 |
| CH | 392268 | | 9/1965 |
| CN | 102943761 | A | 2/2013 |
| CN | 103511331 | A | 1/2014 |
| DE | 1800446 | | 12/1969 |
| DE | 19541093 | A1 | 5/1997 |
| DE | 19614350 | A1 | 10/1997 |
| DE | 102006051814 | B3 | 7/2008 |
| EP | 168250 | | 1/1986 |
| EP | 665378 | | 8/1995 |
| EP | 1019635 | | 6/2006 |
| GB | 212260 | A | 1/1925 |
| GB | 543607 | | 3/1942 |
| GB | 942648 | | 11/1963 |
| GB | 1185314 | | 3/1970 |
| GB | 1565911 | A | 4/1980 |
| GB | 1575991 | A | 10/1980 |
| GB | 2193257 | A | 2/1988 |
| GB | 2217784 | | 3/1989 |
| GB | 2289919 | A | 12/1995 |
| JP | 58048796 | | 3/1983 |
| JP | 63104773 | | 5/1988 |
| JP | 11-270799 | | 10/1999 |
| JP | 5112837 | | 1/2013 |
| MX | 227385 | | 4/2005 |
| NO | 90756 | | 1/1959 |
| SU | 416401 | | 2/1974 |
| SU | 773312 | | 10/1980 |
| WO | 199808990 | | 3/1998 |
| WO | 199825031 | | 6/1998 |
| WO | 200009889 | | 2/2000 |
| WO | 2002012147 | | 2/2002 |
| WO | 2004029307 | | 4/2004 |
| WO | 2010147932 | | 12/2010 |
| WO | 2014031484 | A2 | 2/2014 |
| WO | 2014055082 | | 4/2014 |
| WO | 2014150503 | | 9/2014 |
| WO | 2014185971 | | 11/2014 |

OTHER PUBLICATIONS

Document No. 504217: Excerpts from "Pyrotek Inc.'s Motion for Summary Judgment of Invalidity and Unenforceability of U.S. Pat. No. 7,402,276," Oct. 2, 2009.

Document No. 505026: Excerpts from "MMEI's Response to Pyrotek's Motion for Summary Judgment of Invalidity or Enforceability of U.S. Pat. No. 7,402,276," Oct. 9, 2009.

Document No. 507689: Excerpts from "MMEI's Pre-Hearing Brief and Supplemental Motion for Summary Judgment of Infringement of Claims 3, 4, 15, 17-20, 26, 28 and 29 of the '074 Patent and Motion for Reconsideration of the Validity of Claims 7-9 of the '276 Patent," Nov. 4, 2009.

Document No. 517158: Excerpts from "Reasoned Award," Feb. 19, 2010.

Document No. 525055: Excerpts from "Molten Metal Equipment Innovations, Inc.'s Reply Brief in Support of Application to Confirm Arbitration Award and Opposition to Motion to Vacate," May 12, 2010.

USPTO; Notice of Reissue Examination Certificate dated Aug. 27, 2001 in U.S. Appl. No. 90/005,910.

* cited by examiner

SYSTEM AND METHOD TO FEED MOLD WITH MOLTEN METAL

CROSS REFERENCE TO RELATED APPLICATIONS

This application claims priority to and incorporates by reference: (1) U.S. Provisional Patent Application Ser. No. 62/849,787 filed May 17, 2019 and entitled MOLTEN METAL PUMPS, COMPONENTS, SYSTEMS AND METHODS, and (2) U.S. Provisional Patent Application Ser. No. 62/852,846 filed May 24, 2019 and entitled SMART MOLTEN METAL PUMP.

BACKGROUND OF THE INVENTION

As used herein, the term "molten metal" means any metal or combination of metals in liquid form, such as aluminum, copper, iron, zinc and alloys thereof. The term "gas" means any gas or combination of gases, including argon, nitrogen, chlorine, fluorine, Freon, and helium, which are released into molten metal.

Known molten-metal pumps include a pump base (also called a housing or casing), one or more inlets (an inlet being an opening in the housing to allow molten metal to enter a pump chamber), a pump chamber of any suitable configuration, which is an open area formed within the housing, and a discharge, which is a channel or conduit of any structure or type communicating with the pump chamber (in an axial pump the chamber and discharge may be the same structure or different areas of the same structure) leading from the pump chamber to an outlet, which is an opening formed in the exterior of the housing through which molten metal exits the casing. An impeller, also called a rotor, is mounted in the pump chamber and is connected to a drive system. The drive shaft is typically an impeller shaft connected to one end of a motor shaft, the other end of the drive shaft being connected to an impeller. Often, the impeller (or rotor) shaft is comprised of graphite and/or ceramic, the motor shaft is comprised of steel, and the two are connected by a coupling. As the motor turns the drive shaft, the drive shaft turns the impeller and the impeller pushes molten metal out of the pump chamber, through the discharge, out of the outlet and into the molten metal bath. Most molten metal pumps are gravity fed, wherein gravity forces molten metal through the inlet and into the pump chamber as the impeller pushes molten metal out of the pump chamber. Other molten metal pumps do not include a base or support posts and are sized to fit into a structure by which molten metal is pumped. Most pumps have a metal platform, or super structure, that is either supported by a plurality of support posts attached to the pump base, or unsupported if there is no base. The motor is positioned on the superstructure, if a superstructure is used.

This application incorporates by reference the portions of the following publications that are not inconsistent with this disclosure: U.S. Pat. No. 4,598,899, issued Jul. 8, 1986, to Paul V. Cooper, U.S. Pat. No. 5,203,681, issued Apr. 20, 1993, to Paul V. Cooper, U.S. Pat. No. 5,308,045, issued May 3, 1994, by Paul V. Cooper, U.S. Pat. No. 5,662,725, issued Sep. 2, 1997, by Paul V. Cooper, U.S. Pat. No. 5,678,807, issued Oct. 21, 1997, by Paul V. Cooper, U.S. Pat. No. 6,027,685, issued Feb. 22, 2000, by Paul V. Cooper, U.S. Pat. No. 6,124,523, issued Sep. 26, 2000, by Paul V. Cooper, U.S. Pat. No. 6,303,074, issued Oct. 16, 2001, by Paul V. Cooper, U.S. Pat. No. 6,689,310, issued Feb. 10, 2004, by Paul V. Cooper, U.S. Pat. No. 6,723,276, issued Apr. 20, 2004, by Paul V. Cooper, U.S. Pat. No. 7,402,276, issued Jul. 22, 2008, by Paul V. Cooper, U.S. Pat. No. 7,507,367, issued Mar. 24, 2009, by Paul V. Cooper, U.S. Pat. No. 7,906,068, issued Mar. 15, 2011, by Paul V. Cooper, U.S. Pat. No. 8,075,837, issued Dec. 13, 2011, by Paul V. Cooper, U.S. Pat. No. 8,110,141, issued Feb. 7, 2012, by Paul V. Cooper, U.S. Pat. No. 8,178,037, issued May 15, 2012, by Paul V. Cooper, U.S. Pat. No. 8,361,379, issued Jan. 29, 2013, by Paul V. Cooper, U.S. Pat. No. 8,366,993, issued Feb. 5, 2013, by Paul V. Cooper, U.S. Pat. No. 8,409,495, issued Apr. 2, 2013, by Paul V. Cooper, U.S. Pat. No. 8,440,135, issued May 15, 2013, by Paul V. Cooper, U.S. Pat. No. 8,444,911, issued May 21, 2013, by Paul V. Cooper, U.S. Pat. No. 8,475,708, issued Jul. 2, 2013, by Paul V. Cooper, U.S. patent application Ser. No. 12/895,796, filed Sep. 30, 2010, by Paul V. Cooper, U.S. patent application Ser. No. 12/877,988, filed Sep. 8, 2010, by Paul V. Cooper, U.S. patent application Ser. No. 12/853,238, filed Aug. 9, 2010, by Paul V. Cooper, U.S. patent application Ser. No. 12/880,027, filed Sep. 10, 2010, by Paul V. Cooper, U.S. patent application Ser. No. 13/752,312, filed Jan. 28, 2013, by Paul V. Cooper, U.S. patent application Ser. No. 13/756,468, filed Jan. 31, 2013, by Paul V. Cooper, U.S. patent application Ser. No. 13/791,889, filed Mar. 8, 2013, by Paul V. Cooper, U.S. patent application Ser. No. 13/791,952, filed Mar. 9, 2013, by Paul V. Cooper, U.S. patent application Ser. No. 13/841,594, filed Mar. 15, 2013, by Paul V. Cooper, and U.S. patent application Ser. No. 14/027,237, filed Sep. 15, 2013, by Paul V. Cooper, U.S. Pat. No. 8,535,603 entitled ROTARY DEGASSER AND ROTOR THEREFOR, U.S. Pat. No. 8,613,884 entitled LAUNDER TRANSFER INSERT AND SYSTEM, U.S. Pat. No. 8,714,914 entitled MOLTEN METAL PUMP FILTER, U.S. Pat. No. 8,753,563 entitled SYSTEM AND METHOD FOR DEGASSING MOLTEN METAL, U.S. Pat. No. 9,011,761 entitled LADLE WITH TRANSFER CONDUIT, U.S. Pat. No. 9,017,597 entitled TRANSFERRING MOLTEN METAL USING NON-GRAVITY ASSIST LAUNDER, U.S. Pat. No. 9,034,244 entitled GAS-TRANSFER FOOT, U.S. Pat. No. 9,080,577 entitled SHAFT AND POST TENSIONING DEVICE, U.S. Pat. No. 9,108,244 entitled IMMERSION HEATHER FOR MOLTEN METAL, U.S. Pat. No. 9,156,087 entitled MOLTEN METAL TRANSFER SYSTEM AND ROTOR, U.S. Pat. No. 9,205,490 entitled TRANSFER WELL SYSTEM AND METHOD FOR MAKING SAME, U.S. Pat. No. 9,328,615 entitled ROTARY DEGASSERS AND COMPONENTS THEREFOR, U.S. Pat. No. 9,377,028 entitled TENSIONING DEVICE EXTENDING BEYOND COMPONENT, U.S. Pat. No. 9,382,599 entitled ROTARY DEGASSER AND ROTOR THEREFOR, U.S. Pat. No. 9,383,140 entitled TRANSFERRING MOLTEN METAL FROM ONE STRUCTURE TO ANOTHER, U.S. Pat. No. 9,409,232 entitled MOLTEN METAL TRANSFER VESSEL AND METHOD OF CONSTRUCTION, U.S. Pat. No. 9,410,744 entitled VESSEL TRANSFER INSERT AND SYSTEM, U.S. Pat. No. 9,422,942 entitled TENSION DEVICE WITH INTERNAL PASSAGE, U.S. Pat. No. 9,435,343 entitled GAS-TRANSFER FOOT, U.S. Pat. No. 9,464,636 entitled TENSION DEVICE GRAPHITE COMPONENT USED IN MOLTEN METAL, U.S. Pat. No. 9,470,239 THREADED TENSIONING DEVICE, U.S. Pat. No. 9,481,035 entitled IMMERSION HEATER FOR MOLTEN METAL, U.S. Pat. No. 9,482,469 entitled VESSEL TRANSFER INSERT AND SYSTEM, U.S. Pat. No. 9,506,129 entitled ROTARY DEGASSER AND ROTOR THEREFOR, U.S. Pat. No. 9,566,645 entitled MOLTEN METAL TRANSFER SYSTEM AND ROTOR, U.S. Pat. No. 9,581, 388 entitled VESSEL TRANSFER INSERT AND SYSTEM, U.S. Pat. No. 9,587,883 entitled LADLE WITH TRANSFER CONDUIT, U.S. Pat. No. 9,643,247 entitled MOLTEN METAL TRANSFER AND DEGASSING SYSTEM, U.S. Pat. No. 9,657,578 entitled ROTARY DEGASSERS AND COMPONENTS THEREFOR, U.S. Pat. No. 9,855,600 entitled MOLTEN METAL TRANSFER SYSTEM AND ROTOR, U.S. Pat. No. 9,862,026 entitled METHOD OF FORMING TRANSFER WELL, U.S. Pat. No. 9,903,383 entitled MOLTEN METAL ROTOR WITH HARDENED TOP, U.S. Pat. No. 9,909,808 entitled SYSTEM AND METHOD FOR DEGASSING MOLTEN METAL, U.S. Pat. No. 9,925,587 entitled METHOD OF TRANSFERRING MOLTEN METAL FROM A VESSEL, entitled U.S. Pat. No. 9,982,945 MOLTEN METAL TRANSFER VESSEL AND METHOD OF CONSTRUCTION, U.S. Pat. No. 10,052,688 entitled TRANSFER PUMP LAUNDER SYSTEM, U.S. Pat. No. 10,072,891 entitled TRANSFERRING MOLTEN METAL USING NON-GRAVITY ASSIST LAUNDER, U.S. Pat. No. 10,126,058 entitled MOLTEN METAL TRANSFERRING VESSEL, U.S. Pat. No. 10,126,059 entitled CONTROLLED MOLTEN METAL FLOW FROM TRANSFER VESSEL, U.S. Pat. No. 10,138,892 entitled ROTOR AND ROTOR SHAFT FOR MOLTEN METAL, U.S. Pat. No. 10,195,664 entitled MULTI-STAGE IMPELLER FOR MOLTEN METAL, U.S. Pat. No. 10,267,314 entitled TENSIONED SUPPORT SHAFT AND OTHER MOLTEN METAL DEVICES, U.S. Pat. No. 10,274,256 entitled VESSEL TRANSFER SYSTEMS AND DEVICES, U.S. Pat. No. 10,302,361 entitled TRANSFER VESSEL FOR MOLTEN METAL PUMPING DEVICE, U.S. Pat. No. 10,309,725 entitled IMMERSION HEATER FOR MOLTEN METAL, U.S. Pat. No. 10,307,821 entitled TRANSFER PUMP LAUNDER SYSTEM, U.S. Pat. No. 10,322,451 entitled TRANSFER PUMP LAUNDER SYSTEM, U.S. Pat. No. 10,345,045 entitled VESSEL TRANSFER INSERT AND SYSTEM, U.S. Pat. No. 10,352,620 entitled TRANSFERRING MOLTEN METAL FROM ONE STRUCTURE TO ANOTHER, U.S. Pat. No. 10,428,821 entitled QUICK SUBMERGENCE MOLTEN METAL PUMP, U.S. Pat. No. 10,458,708 entitled TRANSFERRING MOLTEN METAL FROM ONE STRUCTURE TO ANOTHER, U.S. Pat. No. 10,465,688 entitled COUPLING AND ROTOR SHAFT FOR MOLTEN METAL DEVICES, U.S. Pat. No. 10,562,097 entitled MOLTEN METAL TRANSFER SYSTEM AND ROTOR, U.S. Pat. No. 10,570,745 entitled ROTARY DEGASSERS AND COMPONENTS THEREFOR, U.S. Pat. No. 10,641,279 entitled MOLTEN METAL ROTOR WITH HARDENED TIP, U.S. Pat. No. 10,641,270 entitled TENSIONED SUPPORT SHAFT AND OTHER MOLTEN METAL DEVICES, and U.S. patent application Ser. Nos. 16/877,267, 16/877,364, 16/877,332 (Now U.S. Pat. No. 11,471,938), 16/877,182 (Now U.S. Pat. No. 11,358,216) and 16/877,219 (Now U.S. Pa. No. 11,358,217), , entitled MOLTEN METAL CONTROLLED FLOW LAUNDER, MOLTEN METAL TRANSFER SYSTEM AND METHOD, SMART MOLTEN METAL PUMP, SYSTEM FOR MELTING SOLID METAL, and METHOD FOR MELTING SOLID METAL, all of which were filed on the same date as this Application.

Three basic types of pumps for pumping molten metal, such as molten aluminum, are utilized: circulation pumps, transfer pumps and gas-release pumps. Circulation pumps are used to circulate the molten metal within a bath, thereby generally equalizing the temperature of the molten metal. Circulation pumps may be used in any vessel, such as in a reverbatory furnace having an external well. The well is usually an extension of the charging well, in which scrap metal is charged (i.e., added).

Standard transfer pumps are generally used to transfer molten metal from one structure to another structure such as a ladle or another furnace. A standard transfer pump has a riser tube connected to a pump discharge and supported by the superstructure. As molten metal is pumped it is pushed up the riser tube (sometimes called a metal-transfer conduit) and out of the riser tube, which generally has an elbow at its upper end, so molten metal is released into a different vessel from which the pump is positioned.

Gas-release pumps, such as gas-injection pumps, circulate molten metal while introducing a gas into the molten metal. In the purification of molten metals, particularly aluminum, it is frequently desired to remove dissolved gases such as hydrogen, or dissolved metals, such as magnesium. As is known by those skilled in the art, the removing of dissolved gas is known as "degassing" while the removal of magnesium is known as "demagging." Gas-release pumps may be used for either of both of these purposes or for any other application for which it is desirable to introduce gas into molten metal.

Gas-release pumps generally include a gas-transfer conduit having a first end that is connected to a gas source and a second end submerged in the molten metal bath. Gas is introduced into the first end and is released from the second end into the molten metal. The gas may be released downstream of the pump chamber into either the pump discharge or a metal-transfer conduit extending from the discharge, or into a stream of molten metal exiting either the discharge or the metal-transfer conduit. Alternatively, gas may be released into the pump chamber or upstream of the pump chamber at a position where molten metal enters the pump chamber. The gas may also be released into any suitable location in a molten metal bath.

Molten metal pump casings and rotors often employ a bearing system comprising ceramic rings wherein there are one or more rings on the rotor that align with rings in the pump chamber (such as rings at the inlet and outlet) when the rotor is placed in the pump chamber. The purpose of the bearing system is to reduce damage to the soft, graphite components, particularly the rotor and pump base, during pump operation.

Generally, a degasser (also called a rotary degasser) includes (1) an impeller shaft having a first end, a second end and a passage for transferring gas, (2) an impeller, and (3) a drive source for rotating the impeller shaft and the impeller. The first end of the impeller shaft is connected to the drive source and to a gas source and the second end is connected to the impeller.

Generally a scrap melter includes an impeller affixed to an end of a drive shaft, and a drive source attached to the other end of the drive shaft for rotating the shaft and the impeller. The movement of the impeller draws molten metal and scrap metal downward into the molten metal bath in order to melt the scrap. A circulation pump is preferably used in conjunction with the scrap melter to circulate the molten metal in order to maintain a relatively constant temperature within the molten metal.

The materials forming the components that contact the molten metal bath should remain relatively stable in the bath. Structural refractory materials, such as graphite or ceramics, that are resistant to disintegration by corrosive attack from the molten metal may be used. As used herein "ceramics" or "ceramic" refers to any oxidized metal (including silicon) or carbon-based material, excluding graphite, or other ceramic material capable of being used in the environment of a molten metal bath. "Graphite" means any type of graphite, whether or not chemically treated. Graphite is particularly suitable for being formed into pump components because it is (a) soft and relatively easy to machine, (b) not as brittle as ceramics and less prone to breakage, and (c) less expensive than ceramics.

Ceramic, however, is more resistant to corrosion by molten aluminum than graphite. It would therefore be advantageous to develop vertical members used in a molten metal device that are comprised of ceramic, but less costly than solid ceramic members, and less prone to breakage than normal ceramic.

SUMMARY OF THE INVENTION

A system and method for filling a mold with molten aluminum includes a molten metal pump, a vessel configured to contain molten metal, a mold for receiving molten metal, and a conduit between the vessel and the mold. Molten metal is pumped in the vessel until it reaches a level at which it flows through the conduit and into the mold. The molten metal preferably enters the mold from the bottom of the mold. When the mold is deemed by a human or automatic operator to be full enough, the flow of molten metal into the mold is stabilized so the level in the mold basically does not increase or decrease, and a relatively constant level of molten metal in the mold is maintained. A skin of solid metal sufficient to block molten metal form flowing out of the mold and back into the conduit then forms between the mold and the conduit. At that time the pumping of molten metal can cease. The mold with solid metal in it can be moved to any desired location.

A system for transferring molten metal according to this disclosure may comprise: (1) a vessel for retaining molten metal, (2) a dividing wall (or overflow wall) within the vessel, the dividing wall having a height H1 and dividing the vessel into at least a first chamber and a second chamber, (3) a molten metal pump in the vessel, preferably in the first chamber, (4) a mold with a bottom surface at a height H4 and a top surface with a height H5, and (5) a conduit between the second chamber and the mold. The system may also include other devices and structures such as one or more of a rotary degasser, one or more additional pumps, and/or a pump control system.

In this embodiment, the second chamber has a second wall having a height H2, a second opening having a height H3, which is greater than the height of the top of the first opening in the dividing wall, and preferably lower than height H1. The pump (either a transfer, circulation or gas-release pump) is submerged in the first chamber (preferably) and pumps molten metal from the first chamber past the dividing wall and into the second chamber, which causes the level of molten metal in the second chamber to rise. When utilizing such a circulation or gas-release pump the first opening in the dividing wall is used, and the pump outlet communicates with, and may be received partially or totally in, the first opening. When the level of molten metal in the second chamber exceeds height H3, molten metal flows into the conduit. Molten metal enters the mold as the level of molten metal in the second chamber reaches height H4.

In alternate systems, the molten metal level is raised in any suitable manner using a molten metal pumping device or system in order to fill the mold. As an example, a transfer pump may be positioned so that it has an outlet juxtaposed the conduit, and operating the pump moves molten metal into the conduit and into the mold. In this example, the molten metal in the vessel adjacent the conduit could be below the level of the mold.

A system or method according to this disclosure fill a mold with very little or no turbulence because most of the movement of molten metal is beneath the surface. Reducing turbulence helps reduce the formation of dross, and helps maintain a steady, smooth flow of molten metal into the mold.

Preferably, the pump used to transfer molten metal from the first chamber to the second chamber is a variable speed pump. If the pump is a variable speed pump, a control system is used to speed or slow the pump, either manually or automatically, as the amount of molten metal in one or more structures varies. For example, the amount of molten metal in the mold can be determined by measuring the level or weight of molten metal in the mold. When the level of molten metal in the mold is relatively low, the control system could cause the pump to run at a relatively high speed to fill the mold quickly, and as the amount of molten metal in the mold increases, the pump control system could cause the pump to slow and finally to stop.

Utilizing such a variable speed pump further reduces the chance of turbulence and reduces the chance of lags in which there is no molten metal being transferred, or surges that could cause the mold to be over filled. It leads to even and controlled transfer of molten metal.

DETAILED DESCRIPTION

Turning now to the Figures, where the purpose is to describe preferred embodiments of the invention and not to limit same, FIGS. 1-3A show a system 10 for transferring molten metal M into mold 20. System 10 includes a furnace 1A that can retain molten metal M, which includes a holding furnace 1A, a vessel 12, mold 20, and a pump 22.

Figure 1:
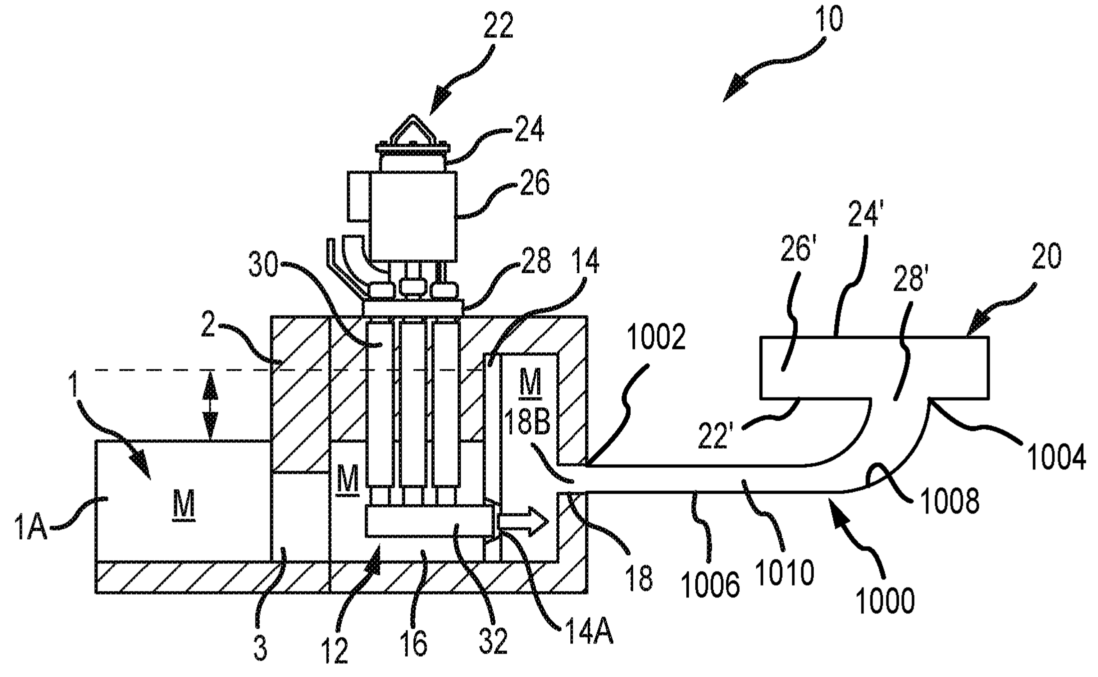
FIG. 1 is a cross-sectional side view of a system according to this disclosure for moving molten metal from a vessel into another structure, such as a mold.
Figure 2:
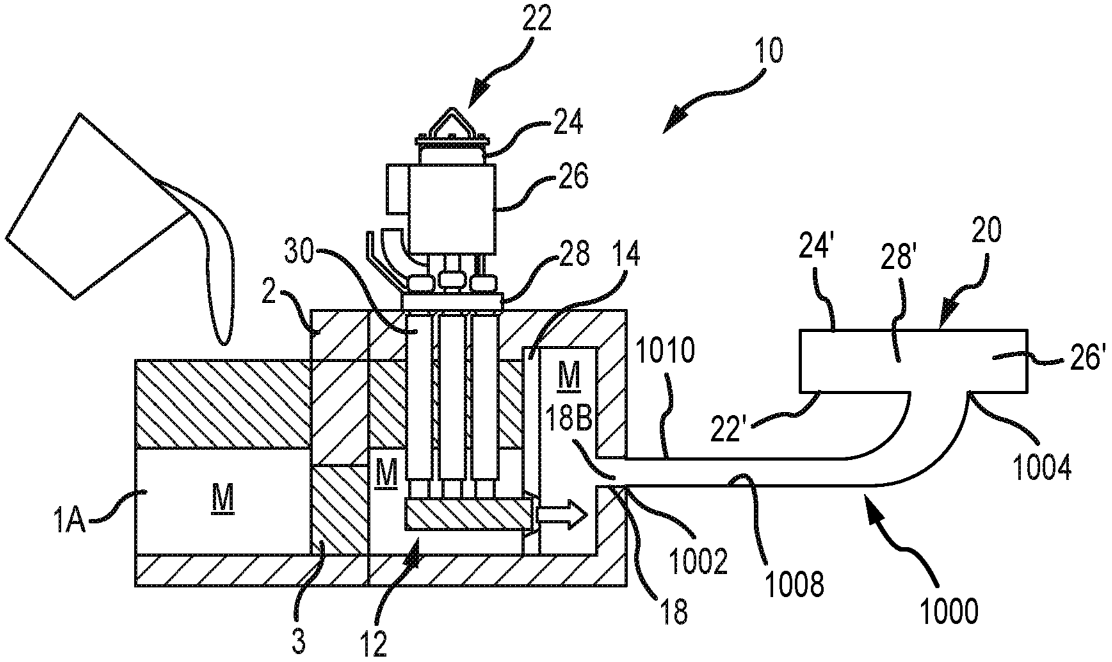
FIG. 2 is the system of FIG. 1 showing the level of molten metal in the furnace being increased.

Using heating elements (not shown in the figures), furnace 1A is raised to a temperature sufficient to maintain the metal therein (usually aluminum or zinc) in a molten state. The level of molten metal M in holding furnace 1A and in at least part of vessel 12 changes as metal is added or removed to furnace 1A, as can be seen in FIG. 2.

Furnace 1A includes a furnace wall 2 having an archway 3. Archway 3 allows molten metal M to flow into vessel 12 from holding furnace 1A. In this embodiment, furnace 1A and vessel 12 are in fluid communication, so when the level of molten metal in furnace 1A rises, the level also rises in at least part of vessel 12. It most preferably rises and falls in first chamber 16, described below, as the level of molten metal rises or falls in furnace 1A. This can be seen in FIG. 2.

Dividing wall 14 separates vessel 12 into at least two chambers, a pump well (or first chamber) 16 and a skim well (or second chamber) 18, and any suitable structure for this purpose may be used as dividing wall 14. As shown in this embodiment, dividing wall 14 has an opening 14A and an optional overflow spillway 14B (best seen in FIG. 3), which is a notch or cut out in the upper edge of dividing wall 14. Overflow spillway 14B is any structure suitable to allow molten metal to flow from second chamber 18, past dividing wall 14, and into first chamber 16 and, if used, overflow spillway 14B may be positioned at any suitable location on wall 14. The purpose of optional overflow spillway 14B is to prevent molten metal from overflowing the second chamber 18, by allowing molten metal in second chamber 18 to flow back into first chamber 16. Optional overflow spillway 14B would not be utilized during normal operation of system 10 and is to be used as a safeguard if the level of molten metal in second chamber 18 improperly rises to too high a level.

Figure 2A:
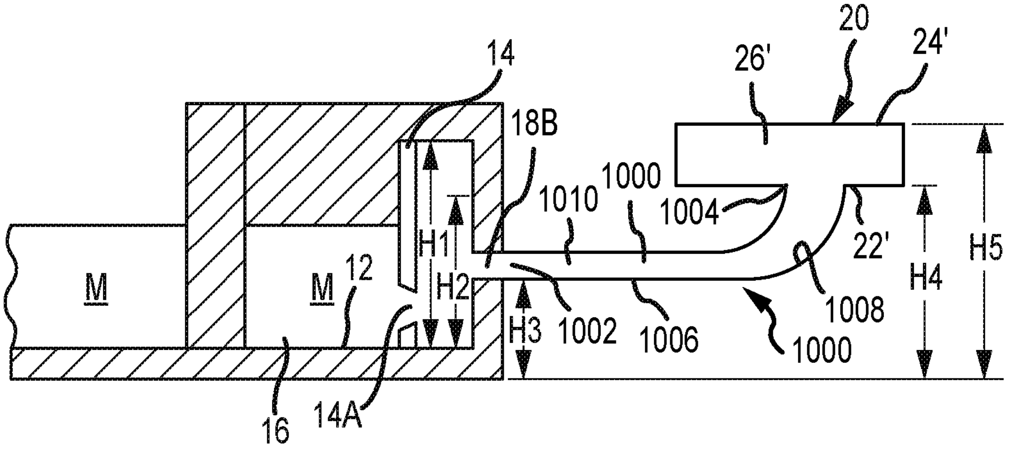
FIG. 2A is a partial, cross-sectional side view of the system of FIGS. 1 and 2 and shows examples of heights H1, H2, H3, H4, and H5.
Figure 2B:
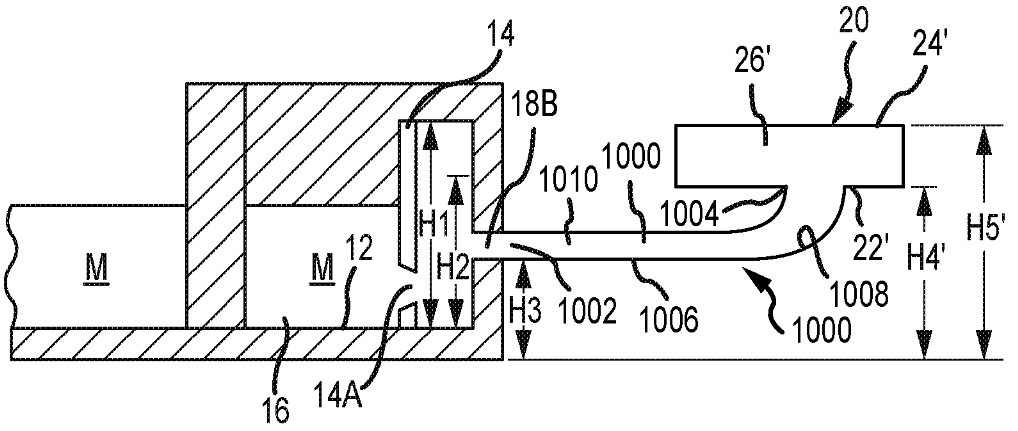
FIG. 2B is a partial, cross-sectional side view of the same system as in FIGS. 1 and 2 except that the mold is at a lower position.
Figure 3:
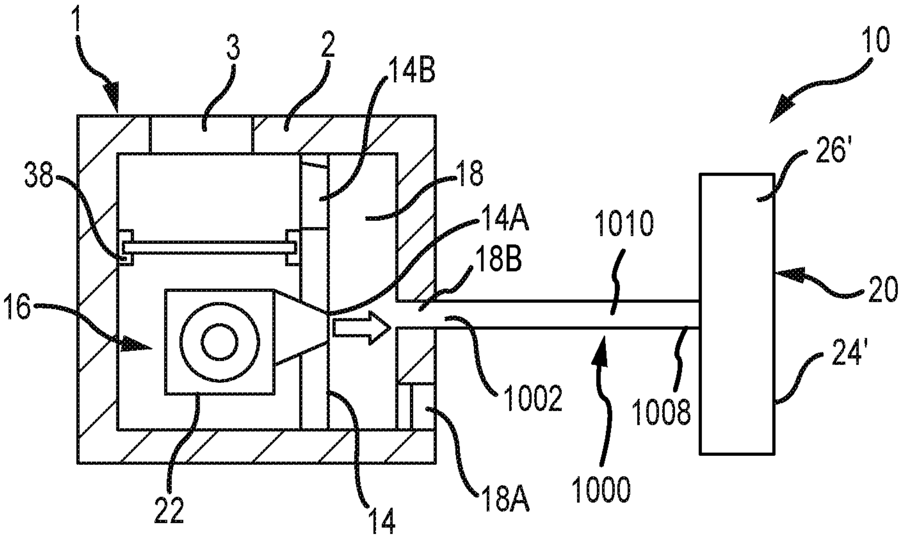
FIG. 3 is a partial, cross-sectional top view of the system of FIG. 1.
Figure 3A:
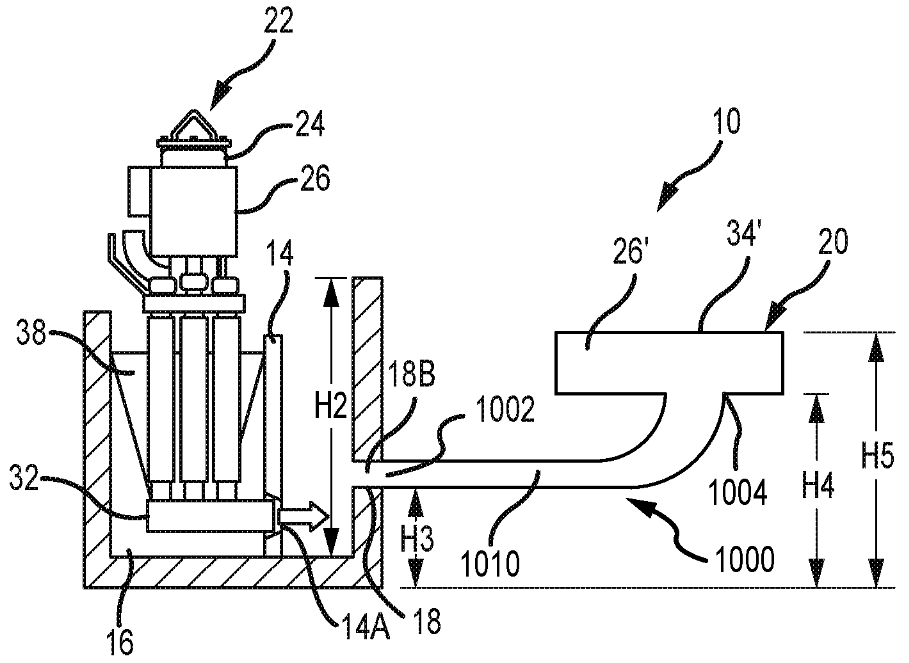
FIG. 3A is a partial, cross-sectional side view of a system according to this disclosure.
Figure 4:
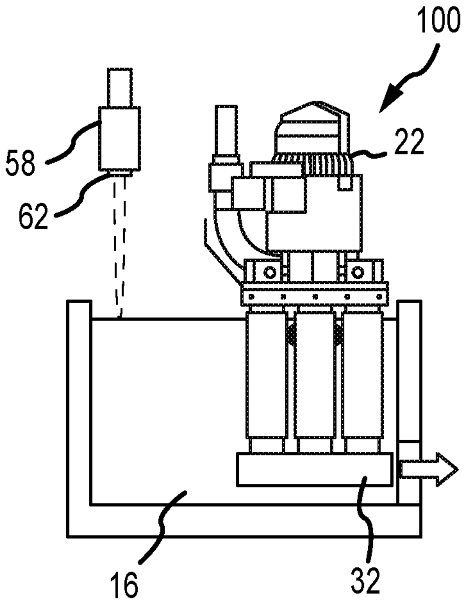
FIG. 4 is a side view of a system according to this disclosure showing a device for measuring the level of molten metal.
Figure 5:
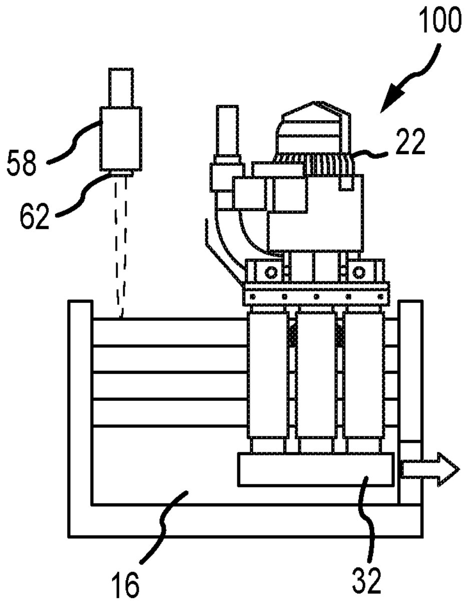
FIG. 5 shows the system of FIG. 1 and represents different levels of molten metal in the vessel.
Figure 6:
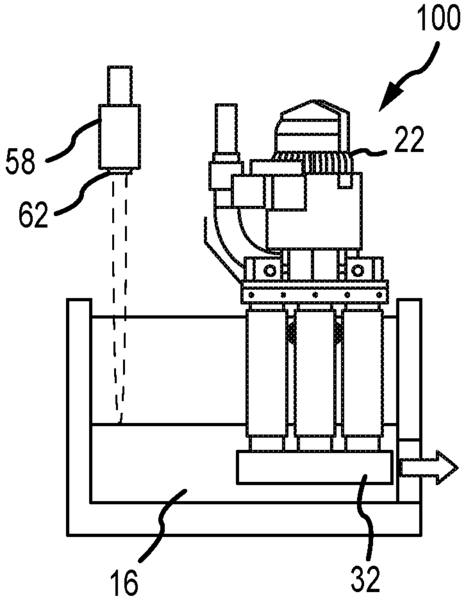
FIG. 6 shows the system of FIG. 1 in which the level of molten metal has decreased to a low level.

At least part of dividing wall 14 has a height H1 (best seen in FIG. 2A), which is the height at which, if exceeded by molten metal in second chamber 18, molten metal flows past the portion of dividing wall 14 at height H1 and back into first chamber 16. In the embodiment shown in FIGS. 1-3A, overflow spillway 14B has a height H1 and the rest of dividing wall 14 has a height greater than H1. Alternatively, dividing wall 14 may not have an overflow spillway, in which case all of dividing wall 14 could have a height H1, or dividing wall 14 may have an opening with a lower edge positioned at height H1, in which case molten metal could flow through the opening if the level of molten metal in second chamber 18 exceeded H1. H1 should exceed the highest level of molten metal in first chamber 16 during normal operation.

Second chamber 18 has a portion 18A, which has a height H2, wherein H2 is greater than at least H3, H4, and H5, described below. Second chamber 18 also has an opening 18B (as can be best seen in FIG. 2A) so during normal operation molten metal pumped into second chamber 18 at least partially fills mold 20.

Dividing wall 14 may also have a first opening 14A that is located at a depth such that first opening 14A is submerged within the molten metal during normal usage, and first opening 14A is preferably near or at the bottom of dividing wall 14. First opening 14A preferably has an area of between 6 in.$^2$ and 24 in.$^2$, but could be any suitable size. Further, dividing wall 14 need not have an opening if a transfer pump were used to transfer molten metal from first chamber 16, over the top of wall 14, and into second chamber 18.

Dividing wall 14 may also include more than one opening between first chamber 16 and second chamber 18 and first opening 14A (or the more than one opening) could be positioned at any suitable location(s) in dividing wall 14 and be of any size(s) or shape(s) to enable molten metal to pass from first chamber 16 into second chamber 18, and to at least partially fill mold 20.

Mold 20 is any structure or device for receiving molten metal from vessel 12, in which the molten metal is ultimately cast into a usable form. Mold 20 may be either an open or enclosed structure of any suitable dimension or length, and may receive any suitable amount of molten metal, such as any amount between 500-5,000 lbs. Mold 20 may be positioned horizontally as shown, or be at any suitable orientation and be of any suitable size and shape. The inside of top 24' of mold 20 is preferably at a height H5, which is most preferably beneath height H2 and above height H3. The mold 20 has an inside surface of bottom 22' at a height H4 that is above height H3 of second opening 19.

Conduit 1000 is a passageway preferably formed of ceramic, such as silicon dioxide, that connects second chamber 18 to mold 20 and places them in fluid communication with one another. Conduit 1000 has a first end 1002, a second end 1004, an outer wall 1006, an inner wall 1008, and a cavity 1010. First end 1002 can be connected to second chamber 18, and second end 1004 can be connected to feed opening 28' of mold 20, in any suitable manner, such as by using cement. Conduit 1000 is preferably surrounded by an insulation 1012.

Molten metal pump 22 may be any device or structure capable of pumping or otherwise conveying molten metal, and may be a transfer, circulation or gas-release pump. Pump 22 is preferably a circulation pump (most preferred) or gas-release pump that generates a flow of molten metal from first chamber 16 to second chamber 18 through first opening 14A. Pump 22 generally includes a motor 24 surrounded by a cooling shroud 26, a superstructure 28, support posts 30 and a base 32. Some pumps that may be used with the invention are shown in U.S. Pat. Nos. 5,203,681, 6,123,523 and 6,354,964 to Cooper, and pending U.S. application Ser. No. 10/773,101 to Cooper. Molten metal pump 22 can be a constant speed pump, but is most preferably a variable speed pump. Its speed can be varied depending on the amount of molten metal in a structure such as a ladle or launder, as discussed below.

If pump 22 is a circulation pump or gas-release pump, it is preferably (but not necessarily) at least partially received in opening 14A in order to at least partially block opening 14A in order to maintain a relatively stable level of molten metal in second chamber 18 during normal operation and to allow the level in second chamber 18 to rise independently of the level in first chamber 16. Utilizing this system the movement of molten metal from one chamber to another and from the second chamber into a launder does not involve raising molten metal above the molten metal surface. As shown, part of base 32 (preferably the discharge portion of the base) is received in opening 14A. Further, pump 22 may communicate with another structure, such as a metal-transfer conduit, that leads to and is received partially or fully in opening 14A. Although it is preferred that the pump base, or communicating structure such as a metal-transfer conduit, be received in opening 14A, all that is necessary for the invention to function is that the operation of the pump increases and maintains the level of molten metal in second chamber 18 so that the molten metal ultimately moves out of chamber 18 and into another structure. For example, the base of pump 22 may be positioned so that its discharge is not received in opening 14A, but is close enough to opening 14A that the operation of the pump raises the level of molten metal in second chamber 18 independent of the level in chamber 16 and causes molten metal to move out of second chamber 18 and into another structure. A sealant, such as cement (which is known to those skilled in the art), may be used to seal base 32 into opening 14A, although it is preferred that a sealant not be used.

Pump 22 is preferably a variable speed pump and its speed is increased or decreased according to the amount of molten metal in a structure, such as second chamber 18, mold 20 and/or 200. For example, if molten metal is being added to mold 20, the amount of molten metal in the mold can be measured, a scale that measures the combined weight of the mold and the molten metal inside the mold or a laser to measure the surface level of molten metal in the mold. When the amount of molten metal in the mold is relatively low, pump 22 can be manually or automatically adjusted to operate at a relatively fast speed to raise the level of molten metal in second chamber 18 and cause molten metal to flow quickly out of second chamber 18 and ultimately into the mold 20. When the amount of molten metal in the mold reaches a certain amount, that is detected and pump 22 is automatically or manually slowed and eventually stopped to prevent overflow of the mold.

Utilizing system 10, as pump 22 pumps molten metal from first chamber 16 into second chamber 18, the level of molten metal in chamber 18 rises. When the level of molten metal M in second chamber 18 exceeds H3, the molten metal begins to flow out of opening 18B and into the conduit 1000. When the molten metal in chamber 18 exceeds level H4 molten metal flows into the bottom 22' of mold 20 through feed opening 28'. As the level of molten metal rises in chamber 18 to level H5, the cavity 26' of mold 20 eventually fills with molten metal. The level of molten metal in mold 20 may not be exactly the same as the level in second chamber 18 at all times because of different relative pressures of moving molten metal in chamber 18 versus moving it through conduit 1000 and into mold 20.

The pumping can then be adjusted to maintain a constant level of molten metal in conduit 1000 and mold 20. Over a period, a solid metal skin forms at the bottom of the mold 20 between mold 20 and conduit 1000. The pumping can then be reduced or stopped so molten metal retreats from second end 1004 of conduit 1000. Mold 20 can be moved away from conduit 1000 when the molten metal inside mold 20 is sufficiently solid.

Once pump 22 is turned off, the respective levels of molten metal level in chambers 16 and 18 essentially equalize. Alternatively, the speed of pump 22 could be reduced to a relatively low speed to keep the level of molten metal in second chamber 18 relatively constant. To fill another mold, pump 22 is simply turned on again and operated as described above. In this manner molds, can be filled efficiently with less turbulence and lags wherein there is too little molten metal in the system.

Figure 9:
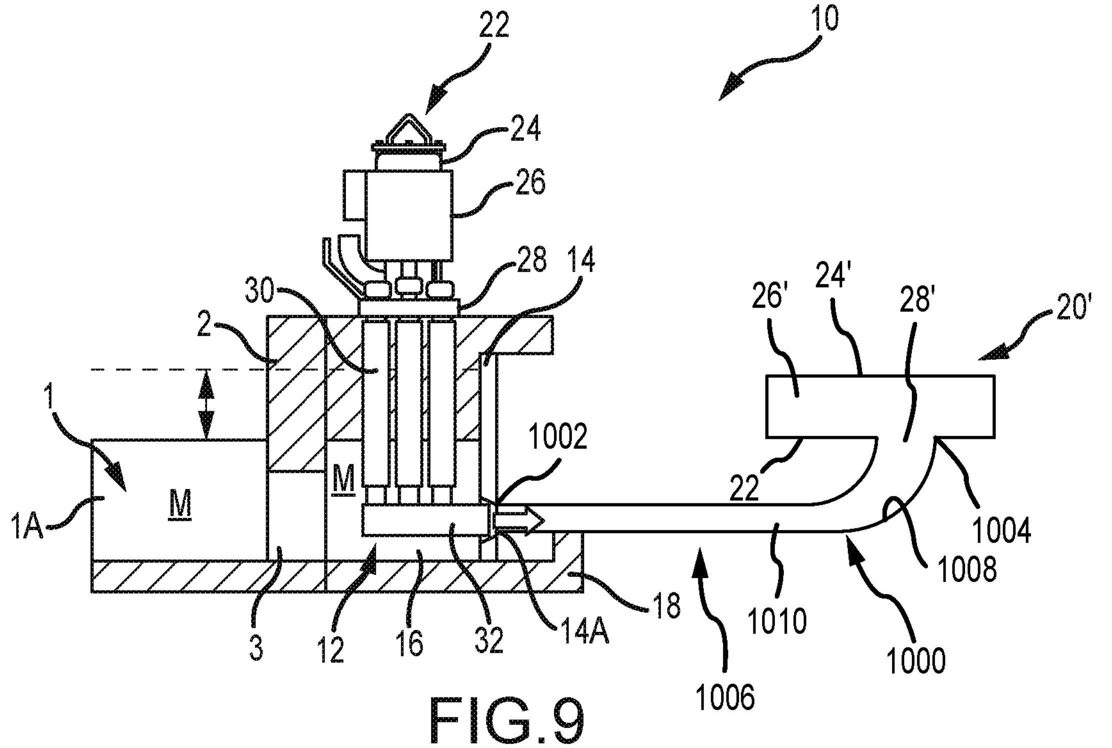
FIG. 9 is a cross-sectional side view of an alternate system according to this disclosure.
Figure 10:
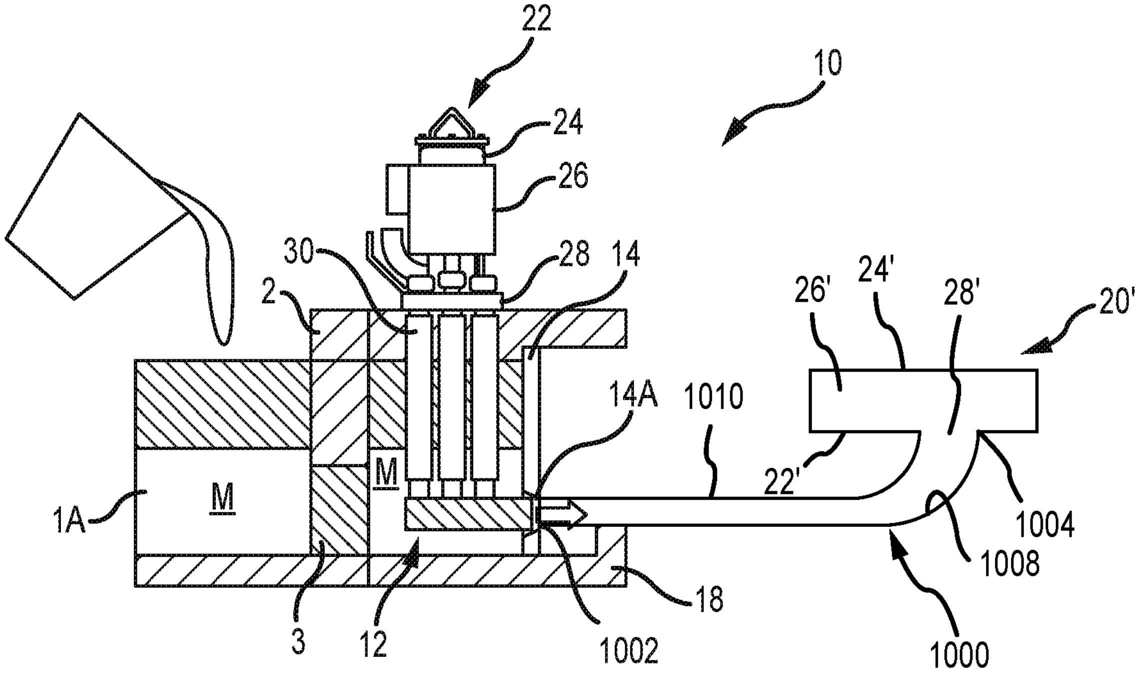
FIG. 10 is the system of FIG. 9 showing the level of molten metal in the furnace being increased.

Alternatively, as shown in FIGS. 9-10, a pump 22 could be juxtaposed the first end 1002 of conduit 1000, so molten metal exiting the pump outlet moves into the conduit 1000 through opening 14A and moves into mold 20 through end 1004 of conduit 1000. In this embodiment, the pumping force moves molten metal into the conduit 1000 and into the mold 20. Therefore, the level of molten metal in the vessel in which pump 22 is positioned can be lower than mold 20.

In another embodiment, chamber 18 may have a stop wall that prevents molten metal from rising in the chamber 18 above a certain level. As the pump moves molten metal from chamber 16 into chamber 18, the pressure in chamber 18 increases and molten metal moves into mold 20 through conduit 1000.

The Figures show the mold 20 being filled from the bottom. Mold 20 (or any mold according to this disclosure) could be filled from the side, preferably at the bottom of a side. The mold should be filled in such a way that there is little or no turbulence, and a solid metal skin can form between the mold and the conduit, so the mold with solid metal inside can be moved with no or little molten metal spilling from the space between the mold and the conduit.

A system according to the invention could also include one or more pumps in addition to pump 22, in which case the additional pump(s) may circulate molten metal within first chamber 16 and/or second chamber 18, or from chamber 16 to chamber 18, and/or may release gas into the molten metal first in first chamber 16 or second chamber 18. For example, first chamber 16 could include pump 22 and a second pump, such as a circulation pump or gas-release pump, to circulate and/or release gas into molten metal M.

A system according to this disclosure could also be operated with a transfer pump, although a pump with a submerged discharge, such as a circulation pump or gas-release pump, is preferred since either would be less likely to create turbulence and dross in second chamber 18, and neither raises the molten metal above the surface of the molten metal bath nor has the other drawbacks associated with transfer pumps. If a transfer pump were used to move molten metal from first chamber 16, over dividing wall 14, and into second chamber 18, there would be no need for opening 14A in dividing wall 14, although an opening could still be provided and used in conjunction with an additional circulation or gas-release pump. As previously described, regardless of what type of pump is used to move molten metal from first chamber 16 to second chamber 18, molten metal would ultimately move out of chamber 18 and into a mold, such as mold 20, when the level of molten metal in second chamber 18 exceeds H4.

Another advantage of a system according to the invention is that a single pump could simultaneously feed molten metal to multiple (i.e., a plurality) of molds. The system shown includes a single pump 22 that causes molten metal to move from first chamber 16 into second chamber 18, where it finally passes out of second chamber 18 and into either one or more molds 20.

FIGS. 4-7 show an alternative system 100 in accordance with the invention, which is in all aspects the same as system 10 except that system 100 includes a control system (not shown) and device 58 to detect the amount of molten metal M within a mold. The control system may or may not be used with a system according to the invention and can vary the speed of, and/or turn off and on, molten metal pump 22 in accordance with a parameter of molten metal M within a structure (such a structure could be a mold 20, first chamber 16, and/or the second chamber 18). For example, if the parameter were the amount of molten metal in a mold, when the amount of molten metal M within the mold is low, the control system could cause the speed of molten metal pump 22 to increase to pump molten metal M at a greater flow rate to raise the level in second chamber 18 and ultimately fill the mold. As the level of the molten metal within the mold increases, the control system could cause the speed of molten metal pump 22 to decrease and to pump molten metal M at a lesser flow rate, thereby ultimately decreasing the flow of molten metal into the mold. The control system could be used to stop the operation of molten metal pump 22 when the amount of molten metal within a structure, such as the mold, reached a given value, such as weight, or if a problem was detected. The control system could also start pump 22 based on a given parameter.

One or more devices 58 may be used to measure one or more parameters of molten metal M, such as the depth, weight, level and/or volume, in any structure or in multiple structures. Device 58 may be located at any position and more than one device 58 may be used. Device 58 may be a laser, float, scale to measure weight, a sound or ultrasound sensor, or a pressure sensor. Device 58 is shown as a laser to measure the level of molten metal in FIGS. 4-5.

The control system may provide proportional control, such that the speed of molten metal pump 22 is proportional to the amount of molten metal within a structure, such as mold 20.

Figure 7:
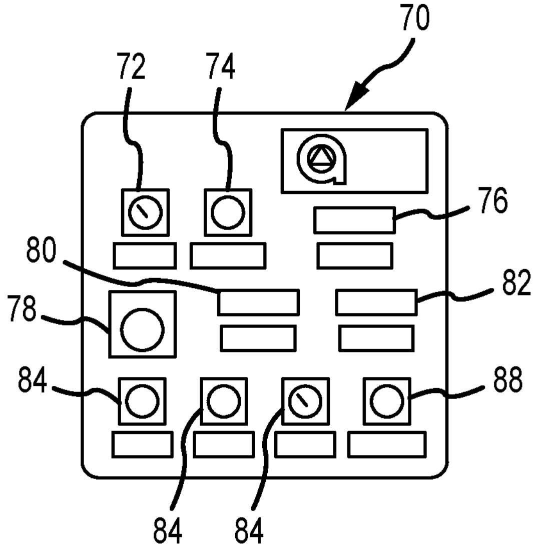
FIG. 7 shows a remote control panel that may be used to control a pump used in a system according to the invention.
Figure 8:
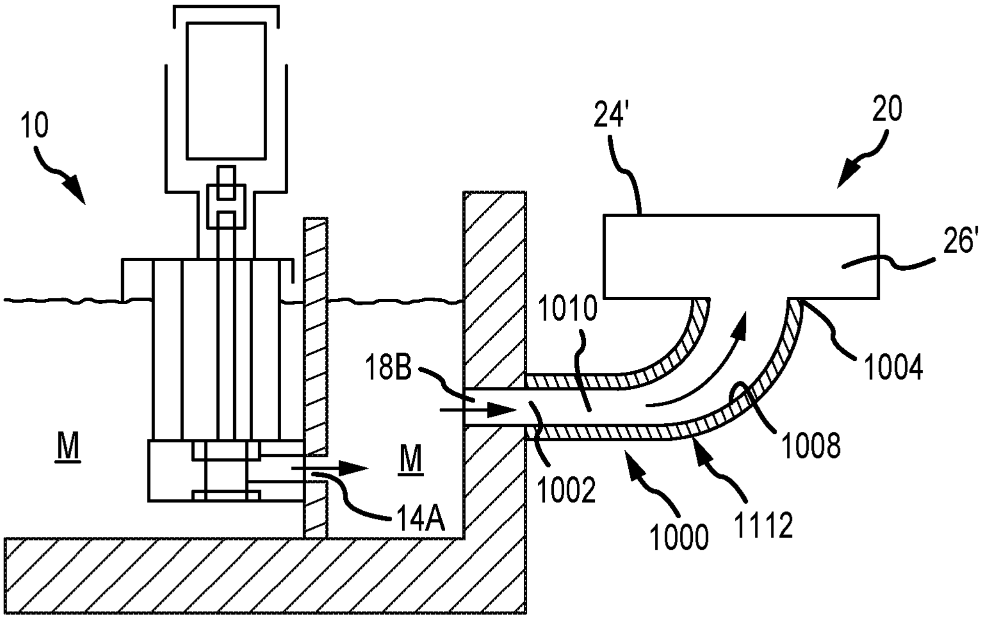
FIG. 8 is a side, cross-sectional view of a system in accordance with this disclosure.

FIG. 7 shows a control panel 70 that may be used with a control system. Control panel 70 includes an "auto/man" (also called an auto/manual) control 72 that can be used to choose between automatic and manual control. A "device on" button 74 allows a user to turn device 58 on and off. An optional "metal depth" indicator 76 allows an operator to determine the depth of the molten metal as measured by device 58. An emergency on/off button 78 allows an operator to stop metal pump 22. An optional RPM indicator 80 allows an operator to determine the number of revolutions per minute of a predetermined shaft of molten metal pump 22. An AMPS indicator 82 allows the operator to determine an electric current to the motor of molten metal pump 22. A start button 84 allows an operator user to start molten metal pump 22, and a stop button 84 allows a user to stop molten metal pump 22.

A speed control 86 can override the automatic control system (if being utilized) and allows an operator to increase or decrease the speed of the molten metal pump. A cooling air button 88 allows an operator to direct cooling air to the pump motor.

Some non-limiting examples of this disclosure are as follows:

Example 1

A system for placing molten aluminum into a mold, the system comprising:

(a) a vessel having a first chamber and a second chamber; a dividing wall separating the first chamber and the second chamber, the dividing wall having a first height H1 and a first opening below the first height H1; wherein the second chamber has an outer wall comprising a second opening having a second height H2 that is above the first opening;

(b) a molten metal pump in the first chamber;

(c) a mold outside of the vessel and above the second opening, the mold having a cavity, a bottom surface at a fourth height H4, a top surface with a fifth height H5, and a mold opening in communication with the cavity; and (d) a conduit leading from the second opening in the outer wall of the second chamber to the mold opening;

wherein when the pump is operated it moves molten metal from the first chamber through the first opening and into the second chamber, and through the conduit and into the mold cavity.

Example 2

The system of example 1, wherein the molten metal pump is a circulation pump.

Example 3

The system of example 1, wherein the molten metal pump is a gas-release pump.

Example 4

The system of example 1, wherein the molten metal pump has a pump housing with an outlet, and the outlet is positioned 6" or less from the opening.

Example 5

The system of example 1, wherein a bracket is connected to the dividing wall and the bracket is also connected to the molten metal pump and configured to maintain the molten metal pump in position in the first chamber.

Example 6

The system of example 5, wherein the molten metal pump has a superstructure that is a metal platform, and the bracket is connected to the superstructure.

Example 7

The system of example 1, wherein the vessel that includes the first chamber and the second chamber is a reverberatory furnace.

Example 8

The system of example 1, wherein the pumping is stopped after a solid metal skin has formed.

Example 9

The system of example 1, wherein the mold is moved after the solid metal skin has formed.

Example 10

The system of example 1, wherein the first opening is between 6 $in^2$ and 24 $in^2$.

Example 11

The system of example 1, wherein the molten metal pump has a pump housing with an outlet, and the outlet is positioned at least partially in the opening.

Example 12

The system of example 1, wherein the mold is comprised of ceramic.

Example 13

The system of example 1, wherein the mold is comprised of silicon carbide.

Example 14

The system of example 1, wherein there is no structure between the second chamber and the conduit.

Example 15

The system of example 1, wherein the conduit is comprised of ceramic.

Example 16

The system of example 1, wherein the conduit is comprised of silicon carbide.

Example 17

The system of example 15, wherein there is no structure between the conduit and the mold.

Example 18

The system of example 1 that includes a second molten metal pump in the second chamber.

Example 19

The system of example 5, wherein the dividing wall has an upper edge and the bracket is on the upper edge.

Example 20

The system of example 5, wherein the molten metal pump has a superstructure that is a metal platform, and the bracket is connected to the superstructure.

Example 21

A system for transferring molten metal to a mold, the system comprising:

(a) a vessel configured to hold molten metal;

(b) a conduit in fluid communication with the vessel;

(c) a molten metal pump in the vessel and an uptake chamber leading to an outlet that is at or above a mold; and (d) a conduit connecting the vessel to a mold.

Example 22

The system of example 21, wherein the molten metal pump is a circulation pump.

Example 23

The system of example 21, wherein the molten metal pump is a gas-release pump.

Example 24

The system of example 21, wherein the conduit has an inner cross-sectional area of between 6 $in^2$ and 24 $in^2$.

Example 25

The system of example 21, wherein the molten metal pump has a housing and an outlet, and the outlet is positioned 6" or less from a first end of the conduit.

Example 26

The system of example 21, wherein a bracket is connected to a wall and the bracket is also connected to the molten metal pump and configured to maintain the molten metal pump in position relative the first end of the conduit.

Example 27

The system of example 21, wherein the conduit is comprised of ceramic.

Example 28

The system of example 21, wherein the conduit is comprised of silicon carbide.

Example 29

The system of example 21, wherein the conduit is covered by an insulator.

Example 30

The system of example 21, wherein there is no structure between the vessel and the conduit.

Example 31

The system of example 21, wherein the mold is comprised of ceramic.

Example 32

The system of example 31, wherein the mold is comprised of silicon carbide.

Example 33

The system of example 26, wherein the dividing wall has an upper edge and the bracket is on the upper edge.

Example 34

The system of example 26, wherein the molten metal pump has a superstructure that is a metal platform, and the bracket is connected to the superstructure.

Example 35

The system of example 1, wherein the pump is a variable speed pump.

Example 36

A method for placing molten aluminum into a mold utilizing a system comprising:

(a) a vessel having a first chamber and a second chamber; a dividing wall separating the first chamber and the second chamber, the dividing wall having a first height H1 and a first opening below the first height H1; wherein the second chamber has an outer wall comprising a second opening having a second height H2 that is above the first opening;

(b) a molten metal pump in the first chamber;

(c) a mold outside of the vessel and above the second opening, the mold having a cavity, a bottom surface at a fourth height H4, a top surface with a fifth height H5, and a mold opening in communication with the cavity; and (d) a conduit leading from the second opening in the outer wall of the second chamber to the mold opening;

wherein the method comprises the following steps:

(a) operating the pump to move molten metal from the first chamber through the dividing wall and into the second chamber;

(b) operating the pump until the mold is at least partially filled with molten metal; and (c) allowing a skin to form over the mold opening, wherein the skin is sufficiently durable so as to prevent the flow of molten metal out of the cavity through the mold opening.

Example 37

The method of example 36, wherein the pumping is not continuous.

Example 38

The method of example 36, wherein the pumping is performed by a transfer pump.

Example 39

The method of example 36, wherein the dividing wall includes an opening positioned below H1.

Example 40

The method of example 36, wherein the pumping is performed by a circulation pump.

Example 41

The method of example 36, wherein the pumping is performed by a gas-release pump.

Example 42

The method of example 36 further comprising the step of measuring an amount of molten metal within one or more of the vessel and the mold.

Example 43

The method of example 42 that further comprises the step of adjusting the speed of the molten metal pump in response to the measured amount.

Example 44

The system of example 1, wherein the molten metal pump has a base configured to be received partially in the first opening of the dividing wall.

Example 45

The method of example 21, wherein the pump has a pump base and a discharge, and the dividing wall has an opening to permit molten metal to be pumped from the first chamber through the first opening and into the second chamber, the discharge being aligned with the first opening so that at least some of the molten metal exiting the discharge passes through the first opening.

Example 46

The method of example 1 that further comprises the step of adjusting the speed of the pumping according to the amount of molten metal in the mold.

Example 47

The method of example 1 that further comprises the step of adjusting the speed of the pumping according to the amount of molten metal in the vessel.

Having thus described different embodiments of the invention, other variations and embodiments that do not depart from the spirit thereof will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired product or result.

What is claimed is:

1. A system for placing molten aluminum into a mold, the system comprising:

(a) a vessel having a first chamber and a second chamber; a dividing wall separating the first chamber and the second chamber, the dividing wall having a first height H1 and a first opening below the first height H1; wherein the second chamber has a second wall with a height H2, wherein the second wall comprises a second opening having a second height H3 that is greater than the height of the first opening, lower than height H2, and lower than the height H1;

(b) a molten metal pump in the first chamber;

(c) a mold outside of the vessel and above the second height H3, the mold having a cavity, a bottom surface at a fourth height H4 that is greater than height H3 and greater than height H2, a top surface having a fifth height H5, and a mold opening at height H4; and (d) a conduit having a first end connected to the second opening and a second end connected to the mold opening, wherein the conduit extends horizontally from the second opening and extends upwards to connect to the mold opening and there is no structure other than the conduit between the first end of the conduit and the second end of the conduit;

wherein when the pump is operated it is configured to move molten metal from the first chamber through the first opening and into the second chamber, through the second opening, and through the conduit and into the mold cavity.

2. The system of claim 1, wherein the molten metal pump is a circulation pump.

3. The system of claim 1, wherein the molten metal pump is a gas-release pump.

4. The system of claim 1, wherein the molten metal pump has a pump housing with an outlet, and the outlet is positioned 6" or less from the first opening.

5. The system of claim 1, wherein a bracket is connected to the dividing wall and the bracket is also connected to the molten metal pump and configured to maintain the molten metal pump in position in the first chamber.

6. The system of claim 5, wherein the molten metal pump has a superstructure that is a metal platform, and the bracket is connected to the superstructure.

7. The system of claim 1, wherein the vessel that includes the first chamber and the second chamber is a reverberatory furnace.

8. The system of claim 1, wherein the molten metal pump has a pump housing with an outlet, and the outlet is positioned at least partially in the first opening.

9. The system of claim 1, wherein the mold is comprised of ceramic.

10. The system of claim 1, wherein the mold is comprised of silicon carbide.

11. The system of claim 1, wherein there is no structure between the second chamber and the conduit.

12. The system of claim 1, wherein the conduit is comprised of ceramic.

13. The system of claim 1, wherein the conduit is comprised of silicon carbide.

14. The system of claim 1 that includes a second molten metal pump in the second chamber.

15. The system of claim 14, wherein there is no structure between the conduit and the mold.

16. A system for transferring molten metal to a mold, the system comprising:

(a) a vessel configured to hold molten metal, wherein the vessel comprises a vessel wall having a height H2 that has an opening formed therein, wherein the opening has a height H3 that is less than height H2;

(b) a conduit having (i) a first end connected to the opening, extending horizontally from the opening and in fluid communication with the vessel, and (ii) a second end connected to a mold having a bottom with a height H4 and a top with a height H5, wherein H3 is less than height H4 and height H5, and height H4 is less than height H5, wherein there is no structure other than the conduit between the first end of the conduit and the second end of the conduit; and (c) a molten metal pump in the vessel, wherein the molten metal pump comprises an outlet that is in fluid communication with the opening in the vessel wall and that is configured to pump molten metal through the opening, through the opening with a height H3, through the conduit, and into the mold.

17. The system of claim 16, wherein the molten metal pump is a circulation pump.

18. The system of claim 16, wherein the molten metal pump is a gas-release pump.

19. The system of claim 16, wherein a bracket is connected to a wall of the vessel and the bracket is also connected to the molten metal pump and the bracket is configured to maintain the molten metal pump in position in the vessel.

20. The system of claim 16, wherein the conduit is covered by an insulator.

21. The system of claim 16, wherein there is no structure between the vessel and the conduit.

22. The system of claim 16, wherein the mold is comprised of ceramic.

23. The system of claim 19, wherein the molten metal pump has a superstructure that is a metal platform, and the bracket is connected to the superstructure.

24. The system of claim 16 that further comprises an insulator at least partially surrounding the conduit.

25. The system of claim 16, wherein the second end of the conduit connects to the bottom of the mold.

* * * * *